United States Patent
Matsumura et al.

(10) Patent No.: US 12,156,041 B2
(45) Date of Patent: Nov. 26, 2024

(54) USER TERMINAL AND RADIO COMMUNICATION METHOD

(71) Applicant: NTT DOCOMO, INC., Tokyo (JP)

(72) Inventors: Yuki Matsumura, Tokyo (JP); Satoshi Nagata, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 514 days.

(21) Appl. No.: 17/423,625

(22) PCT Filed: Jan. 18, 2019

(86) PCT No.: PCT/JP2019/001533
§ 371 (c)(1),
(2) Date: Jul. 16, 2021

(87) PCT Pub. No.: WO2020/148903
PCT Pub. Date: Jul. 23, 2020

(65) Prior Publication Data
US 2022/0104031 A1   Mar. 31, 2022

(51) Int. Cl.
*H04W 16/28* (2009.01)
*H04L 5/00* (2006.01)
*H04W 24/08* (2009.01)
*H04W 72/04* (2023.01)
*H04W 72/0446* (2023.01)
*H04W 72/23* (2023.01)

(52) U.S. Cl.
CPC .......... *H04W 16/28* (2013.01); *H04L 5/0051* (2013.01); *H04W 24/08* (2013.01); *H04W 72/0446* (2013.01); *H04W 72/23* (2023.01)

(58) Field of Classification Search
None
See application file for complete search history.

(56) References Cited

U.S. PATENT DOCUMENTS

| | | | |
|---|---|---|---|
| 2019/0190582 A1* | 6/2019 | Guo ...................... | H04L 1/0061 |
| 2020/0112926 A1* | 4/2020 | Laghate ................ | H04B 7/0404 |
| 2020/0229098 A1* | 7/2020 | Cheng ............... | H04W 52/0248 |

OTHER PUBLICATIONS

Extended European Search Report issued in counterpart European Patent Application No. 19910745.9, mailed on Aug. 1, 2022 (6 pages).
Huawei, HiSilicon; "Further details on beam indication"; 3GPP TSG RAN WG1 Meeting #91, R1-1719806; Reno, USA, Nov. 27-Dec. 1, 2017 (12 pages).
(Continued)

*Primary Examiner* — Scott M Sciacca
(74) *Attorney, Agent, or Firm* — Osha Bergman Watanabe & Burton LLP

(57) ABSTRACT

A user terminal according to one aspect of the present disclosure includes a control section that assumes that spatial relation of specific uplink transmission is same as a transmission configuration indication (TCI) state of a specific downlink channel or quasi-co-location (QCL) assumption, and a transmitting section that performs the specific uplink transmission by using the spatial relation. According to one aspect of the present disclosure, control of a UL beam can be appropriately performed.

4 Claims, 6 Drawing Sheets

SPECIFIC DL CHANNEL
TCI STATE : b2   ⟶   SPECIFIC UL TRANSMISSION
SPATIAL RELATION : b2

(56) References Cited

OTHER PUBLICATIONS

3GPP TS 36.300 V8.12.0 "3rd Generation Partnership Project; Technical Specification Group Radio Access Network; Evolved Universal Terrestrial Radio Access (E-UTRA) and Evolved Universal Terrestrial Radio Access Network (EUTRAN); Overall description; Stage 2 (Release 8)" Mar. 2010 (149 pages).
3GPP TSG-RAN WG1 Meeting #95; R1-1813609 "UL beam selection improvements" Ericsson; Spokane, USA; Nov. 12-16, 2018 (5 pages).
International Search Report issued in International Application No. PCT/JP2019/001533, mailed Mar. 12, 2019 (3 pages).
Written Opinion issued in International Application No. PCT/JP2019/001533; Dated Mar. 12, 2019 (4 pages).

* cited by examiner

USER TERMINAL AND RADIO COMMUNICATION METHOD

TECHNICAL FIELD

The present disclosure relates to a user terminal and a radio communication method in next-generation mobile communication systems.

BACKGROUND ART

In Universal Mobile Telecommunications System (UMTS) networks, the specifications of Long-Term Evolution (LTE) have been drafted for the purpose of further increasing high speed data rates, providing lower latency, and so on (see Non-Patent Literature 1). In addition, for the purpose of further high capacity, advancement and the like of the LTE (Third Generation Partnership Project (3GPP) Release (Rel.) 8 and Rel. 9), the specifications of LTE-Advanced (3GPP Rel. 10 to Rel. 14) have been drafted.

Successor systems of LTE (e.g., referred to as "5th generation mobile communication system (5G))," "5G+ (plus)," "New Radio (NR)," "3GPP Rel. 15 (or later versions)," and so on) are also under study.

In existing LTE systems (for example, LTE Rel. 8 to Rel. 14), a user terminal (UE (User Equipment)) controls transmission of an uplink shared channel (Physical Uplink Shared Channel (PUSCH)), based on downlink control information (DCI).

CITATION LIST

Non-Patent Literature

Non-Patent Literature 1: 3GPP TS 36.300 V8.12.0 "Evolved Universal Terrestrial Radio Access (E-UTRA) and Evolved Universal Terrestrial Radio Access Network (E-UTRAN); Overall description; Stage 2 (Release 8)," April, 2010

SUMMARY OF INVENTION

Technical Problem

In future radio communication systems (for example, NR), specification of one of a plurality of candidates configured by using higher layer signaling with respect to beams (spatial relation) of uplink (UL) transmission, such as a PUCCH, a PUSCH, and an SRS, by using a medium access control (MAC) control element (CE), downlink control information (DCI), or the like has been under study.

However, the number of candidates that can be configured is limited. When reconfiguration using higher layer signaling is performed in order to use a large number of candidates, a delay may occur or resources may be consumed, for example.

In the light of the above, the present disclosure has an object to provide a user terminal and a radio communication method that appropriately perform control of a UL beam.

Solution to Problem

A user terminal according to one aspect of the present disclosure includes a control section that assumes that spatial relation of specific uplink transmission is same as a transmission configuration indication (TCI) state of a specific downlink channel or quasi-co-location (QCL) assumption, and a transmitting section that performs the specific uplink transmission by using the spatial relation.

Advantageous Effects of Invention

According to one aspect of the present disclosure, control of a UL beam can be appropriately performed.

DESCRIPTION OF EMBODIMENTS

TCI, Spatial Relation, and QCL

Figure 1:
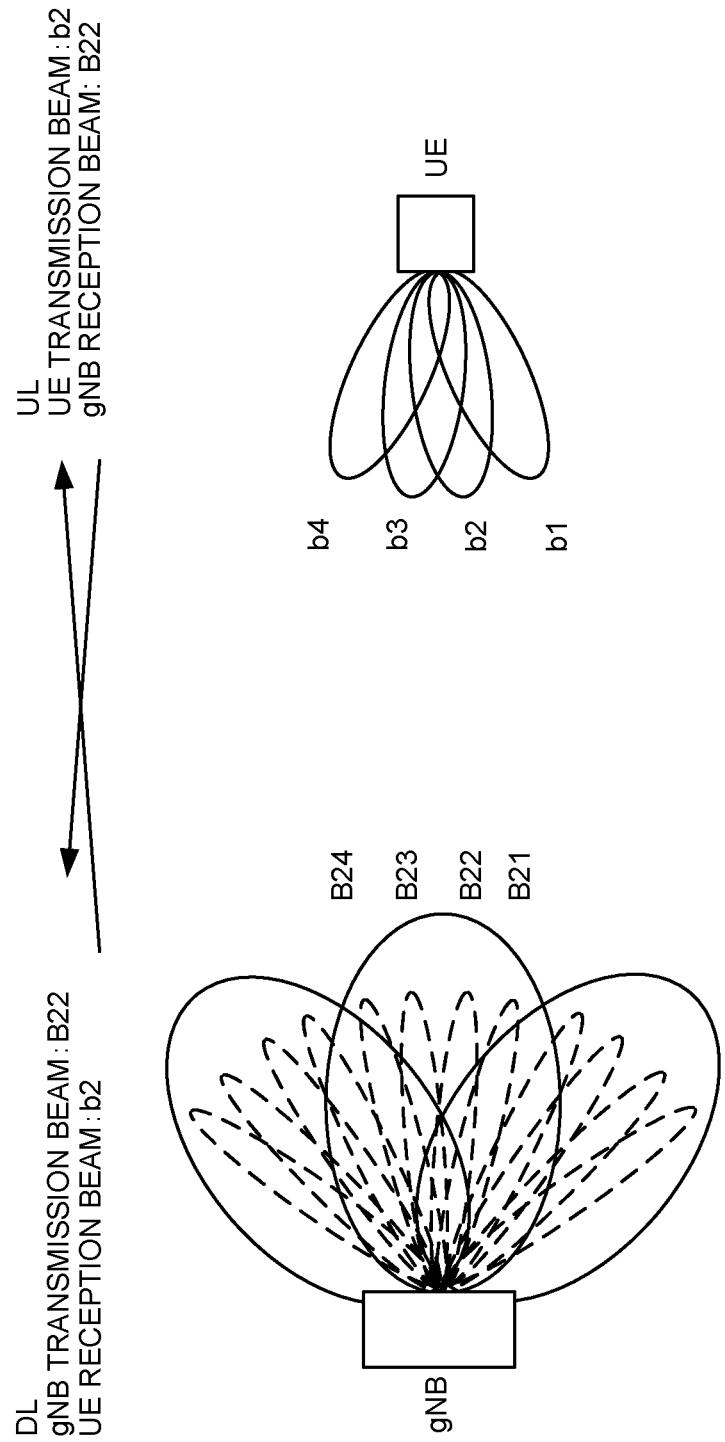
FIG. 1 is a diagram to show an example of beam correspondence.

In NR, control of a reception process (for example, at least one of reception, de-mapping, demodulation, and decoding) and a transmission process (for example, at least one of transmission, mapping, precoding, modulation, and coding) for at least one of a signal and a channel (expressed as a signal/channel) in a UE, based on a transmission configuration indication state (TCI state) has been under study.

The TCI state may represent what is applied to a downlink signal/channel. What corresponds to the TCI state applied to an uplink signal/channel may be expressed as spatial relation.

The TCI state refers to information that is related to quasi-co-location (QCL) of a signal/channel, and may be referred to as a spatial reception parameter, spatial relation information (SRI), or the like. The TCI state may be configured for the UE for each channel or for each signal.

The QCL is an indicator that indicates statistical characteristics of a signal/channel. For example, when a certain signal/channel and another signal/channel are in a relationship of QCL, this may mean that it can be assumed that at least one of a Doppler shift, a Doppler spread, an average delay, a delay spread, and a spatial parameter (for example, a spatial reception parameter (spatial Rx parameter)) is the same (at least one of these is QCL) among such a plurality of different signals/channels.

Note that the spatial reception parameter may correspond to a receive beam (for example, a receive analog beam) of the UE, and a beam may be specified based on spatial QCL. The QCL (or at least one element of the QCL) according to the present disclosure may be interpreted as an sQCL (spatial QCL).

In the QCL, a plurality of types (QCL types) may be defined. For example, four QCL types A-D having different parameters (or parameter sets) that can be assumed to be the same may be provided. The parameters are listed as follows:

QCL type A: Doppler shift, Doppler spread, average delay, and delay spread

QCL type B: Doppler shift and Doppler spread

QCL type C: Doppler shift and average delay

QCL type D: Spatial reception parameter

An operation that the UE assumes that a certain control resource set (CORESET), channel, or reference signal is in a relationship of specific QCL (for example, QCL type D) with another CORESET, channel, or reference signal may be referred to as QCL assumption.

The UE may determine at least one of a transmit beam (Tx beam) and a receive beam (Rx beam) of the signal/channel, based on the TCI state or the QCL assumption of the signal/channel.

The TCI state may be, for example, information related to the QCL between a channel as a target (or a reference signal (RS) for the channel) and another signal (for example, another downlink reference signal (DL-RS)). The TCI state may be configured (indicated) by using higher layer signaling or physical layer signaling, or by using a combination of these.

In the present disclosure, the higher layer signaling may be, for example, any one of Radio Resource Control (RRC) signaling, Medium Access Control (MAC) signaling, broadcast information, and the like, or a combination of these.

The MAC signaling may use, for example, a MAC control element (MAC CE), a MAC Protocol Data Unit (PDU), and the like. The broadcast information may be, for example, a master information block (MIB), a system information block (SIB), minimum necessary system information (Remaining Minimum System Information (RMSI)), other system information (OSI), and the like.

The physical layer signaling may be, for example, downlink control information (DCI).

A channel in which the TCI state is configured (specified) may be, for example, at least one of a downlink shared channel (Physical Downlink Shared Channel (PDSCH)), a downlink control channel (Physical Downlink Control Channel (PDCCH)), an uplink shared channel (Physical Uplink Shared Channel (PUSCH)), and an uplink control channel (Physical Uplink Control Channel (PUCCH)).

The RS that has a QCL relation with the channel may be, for example, at least one of a synchronization signal block (SSB), a channel state information reference signal (CSI-RS), and a measurement reference signal (Sounding Reference Signal (SRS)).

The SSB is a signal block including at least one of a primary synchronization signal (PSS), a secondary synchronization signal (SSS), and a broadcast channel (Physical Broadcast Channel (PBCH)). The SSB may be referred to as an SS/PBCH block.

An information element ("TCI-state IE" of RRC) of the TCI state configured by using the higher layer signaling may include one or a plurality of pieces of QCL information ("QCL-Info"). The QCL information may include at least one of information related to the DL-RS to have a QCL relation (DL-RS relation information) and information indicating a QCL type (QCL type information). The DL-RS relation information may include information such as an index of the DL-RS (for example, an SSB index or a non-zero power CSI-RS (NZP CSI-RS) resource ID (Identifier)), an index of a cell in which the RS is located, and an index of a Bandwidth Part (BWP) in which the RS is located.

TCI State for PDCCH

Information related to the PDCCH (or a demodulation reference signal (DMRS) antenna port related to the PDCCH) and the QCL with a certain DL-RS may be referred to as a TCI state for the PDCCH or the like.

The UE may judge the TCI state for the PDCCH (CORESET) that is specific to the UE, based on higher layer signaling. For example, for the UE, one or a plurality of (K) TCI states may be configured by using the RRC signaling for each CORESET.

For the UE, one of the plurality of TCI states configured by using the RRC signaling may be activated for each CORESET by using a MAC CE. The MAC CE may be referred to as a TCI state indication MAC CE for the UE-specific PDCCH (TCI State Indication for UE-specific PDCCH MAC CE). The UE may perform monitoring of the CORESET, based on the active TCI state corresponding to the CORESET.

TCI State for PDSCH

Information related to the PDSCH (or a DMRS antenna port related to the PDSCH) and the QCL with a certain DL-RS may be referred to as a TCI state for the PDSCH or the like.

M (M≥1) TCI states for the PDSCH (M pieces of QCL information for the PDSCH) may be reported to (configured for) the UE by using higher layer signaling. Note that the number M of TCI states configured for the UE may be limited by at least one of UE capability and a QCL type.

The DCI used for scheduling of the PDSCH may include a certain field indicating a TCI state for the PDSCH (which may be referred to as, for example, a TCI field, a TCI state field, or the like). The DCI may be used for scheduling of the PDSCH of one cell, and may be referred to as, for example, DL DCI, DL assignment, DCI format 1_0, DCI format 1_1, or the like.

Whether or not the TCI field is included in the DCI may be controlled by using information reported from the base station to the UE. The information may be information (TCI-PresentInDCI) indicating whether the TCI field is present or not (present or absent) in the DCI. The information may be, for example, configured for the UE by using higher layer signaling.

When more than eight types of TCI states are configured for the UE, eight or less types of TCI states may be activated (or specified) by using a MAC CE. The MAC CE may be referred to as a TCI state activation/deactivation MAC CE for the UE-specific PDSCH (TCI States Activation/Deactivation for UE-specific PDSCH MAC CE). The value of the TCI field in the DCI may indicate one of the TCI states activated by using the MAC CE.

When a time offset between reception of the DL DCI and reception of the PDSCH corresponding to the DCI is equal to or larger than a certain threshold, the UE may assume that the RS in the TCI state related to a QCL type parameter given by the TCI state indicated by the DCI and a DMRS port of the PDSCH of a serving cell are QCL ("the DM-RS ports of PDSCH of a serving cell are quasi co-located with the RS(s) in the TCI state with respect to the QCL type parameter(s) given by the indicated TCI state").

The time offset between the reception of the DL DCI and the reception of the PDSCH corresponding to the DCI may be referred to as a scheduling offset.

The certain threshold may be referred to as a "Threshold," a "Threshold for offset between a DCI indicating a TCI state and a PDSCH scheduled by the DCI," a "Threshold-Sched-Offset," a schedule offset threshold, a scheduling offset threshold, or the like.

The scheduling offset threshold may be based on the UE capability, and may be, for example, based on a delay that is required for decoding of the PDCCH and beam switching.

Information of the scheduling offset threshold may be configured by the base station by using the higher layer signaling, or may be transmitted from the UE to the base station.

When the scheduling offset is less than the scheduling offset threshold, the UE may assume that the RS in the TCI state related to a QCL parameter used for PDCCH QCL indication corresponding to a minimum CORESET-ID in the latest (the most recent) slot in which one or more CORESETs are configured for the UE in an active BWP of a serving cell and the DMRS port of the PDSCH of the serving cell are QCL (the DM-RS ports of PDSCH of a serving cell are quasi co-located with the RS(s) in the TCI state with respect to the QCL parameter(s) used for PDCCH quasi co-location indication of the lowest CORESET-ID in the latest slot in which one or more CORESETs within the active BWP of the serving cell are configured for the UE).

For example, the UE may assume that the DMRS port of the PDSCH is QCL with the DL-RS that is based on the TCI state activated for the CORESET corresponding to the minimum CORESET-ID. The latest slot may be, for example, a slot in which the DCI for scheduling the PDSCH is received.

Note that the CORESET-ID may be an ID configured by using an RRC information element "ControlResourceSet" (ID for identification of the CORESET).

Spatial Relation for PUCCH

For the UE, parameters (PUCCH configuration information, PUCCH-Config) used for PUCCH transmission may be configured by using higher layer signaling (for example, Radio Resource Control (RRC) signaling). The PUCCH configuration information may be configured for each partial band (for example, an uplink bandwidth part (Bandwidth-part (BWP))) in a carrier (also referred to as a cell, a component carrier, or the like).

The PUCCH configuration information may include a list of pieces of PUCCH resource set information (for example, PUCCH-ResourceSet) and a list of pieces of PUCCH spatial relation information (for example, PUCCH-SpatialRelation-Info).

The PUCCH resource set information may include a list of PUCCH resource indices (IDs, for example, PUCCH-ResourceId) (for example, resourceList).

When the UE does not have dedicated PUCCH resource configuration information (for example, a dedicated PUCCH resource configuration) that is provided by using the PUCCH resource set information in the PUCCH configuration information (before RRC setup), the UE may determine the PUCCH resource set, based on a parameter (for example, pucch-ResourceCommon) in the system information (for example, System Information Block Type 1 (SIB1) or Remaining minimum system information (RMSI)). The PUCCH resource set may include 16 PUCCH resources.

On the other hand, when the UE has the dedicated PUCCH resource configuration information (a UE-dedicated uplink control channel configuration or a dedicated PUCCH resource configuration) (after RRC setup), the UE may determine the PUCCH resource set, according to the number of UCI information bits.

The UE may determine one PUCCH resource (index) in the PUCCH resource set (for example, the PUCCH resource set that is determined to be cell-specific or UE-dedicated), based on at least one of the value of a certain field (for example, a PUCCH resource indicator field) in the downlink control information (DCI) (for example, DCI format 1_0 or 1_1 used for scheduling of the PDSCH), the number ($N_{CCE}$) of CCEs in the control resource set (CORESET) for PDCCH reception used for carrying the DCI, and an index ($n_{CCE,0}$) of the start (first) CCE in the PDCCH reception.

The PUCCH spatial relation information (for example, "PUCCH-spatialRelationInfo" of the RRC information element) may indicate a plurality of candidate beams (spatial domain filters) for PUCCH transmission. The PUCCH spatial relation information may indicate spatial association between the RS (Reference signal) and the PUCCH.

The list of pieces of PUCCH spatial relation information may include some elements (PUCCH spatial relation information IEs (Information Elements)). Each piece of PUCCH spatial relation information may include, for example, at least one of an index of the PUCCH spatial relation information (ID, for example, pucch-SpatialRelationInfoId), an index of the serving cell (ID, for example, servingCellId), and information related to the RS (reference RS) to have spatial relation with the PUCCH.

For example, the information related to the RS may be an SSB index, a CSI-RS index (for example, an NZP (Non-Zero Power)-CSI-RS resource configuration ID), or an SRS resource ID and an ID of the BWP. The SSB index, the CSI-RS index, and the SRS resource ID may be associated with at least one of a beam, a resource, and a port that is selected through measurement of a corresponding RS.

For the UE, one of one or more pieces of PUCCH spatial relation information (for example, PUCCH-SpatialRelation-Info or a candidate beam) in the list of pieces of PUCCH spatial relation information may be indicated by using the MAC (Medium Access Control) CE (Control Element). The MAC CE may be a MAC CE for activating or deactivating the PUCCH spatial relation information (PUCCH spatial relation information activation/deactivation MAC CE, PUCCH spatial relation information indication MAC CE).

After 3 ms have elapsed from transmission of a positive response (ACK) for the MAC CE for activating certain PUCCH spatial relation information, the UE may activate the PUCCH spatial relation information specified by using the MAC CE.

The UE may control transmission of the PUCCH, based on the PUCCH spatial relation information activated by using the MAC CE. Note that, when a single piece of PUCCH spatial relation information is included in the list of pieces of PUCCH spatial relation information, the UE may control transmission of the PUCCH, based on the piece of PUCCH spatial relation information.

Spatial Relation for SRS and PUSCH

The UE may receive information (SRS configuration information, for example, parameters in "SRS-Config" of the RRC control element) used for transmission of a measurement reference signal (for example, a sounding reference signal (SRS)).

Specifically, the UE may receive at least one of information related to one or a plurality of SRS resource sets (SRS resource set information, for example, "SRS-ResourceSet" of the RRC control element) and information related to one or a plurality of SRS resources (SRS resource information, for example, "SRS-Resource" of the RRC control element).

One SRS resource set may be related to a certain number of SRS resources (the certain number of SRS resources may be grouped together). Each SRS resource may be specified by using an SRS resource identifier (SRS Resource Indicator (SRI)) or an SRS resource ID (Identifier).

The SRS resource set information may include an SRS resource set ID (SRS-ResourceSetId), a list of SRS resource IDs (SRS-ResourceId) used in the resource set, an SRS resource type (for example, any one of a periodic SRS, a semi-persistent SRS, and aperiodic CSI (Aperiodic SRS)), and information of usage of the SRS.

Here, the SRS resource type may indicate any one of the periodic SRS (P-SRS), the semi-persistent SRS (SP-SRS), and the aperiodic CSI (Aperiodic SRS (A-SRS)). Note that the UE may transmit the P-SRS and the SP-SRS periodically (or periodically after activation), and transmit the A-SRS, based on an SRS request of the DCI.

The usage ("usage" of an RRC parameter or "SRS-SetUse" of an L1 (Layer-1) parameter) may be, for example, beam management (beamManagement), a codebook (CB), a noncodebook (NCB), antenna switching, or the like. The SRS with the usage of the codebook or the noncodebook may be used for determination of a precoder of codebook-based or noncodebook-based PUSCH transmission that is based on the SRI.

For example, in a case of the codebook-based transmission, the UE may determine the precoder for the PUSCH transmission, based on the SRI, a transmitted rank indicator (TRI), and a transmitted precoding matrix indicator (TPMI). In a case of the noncodebook-based transmission, the UE may determine the precoder for the PUSCH transmission, based on the SRI.

The SRS resource information may include an SRS resource ID (SRS-ResourceId), the number of SRS ports, an SRS port number, a transmission Comb, SRS resource mapping (for example, a time and/or frequency resource position, a resource offset, periodicity of resources, the number of repetitions, the number of SRS symbols, an SRS bandwidth, and the like), hopping related information, an SRS resource type, a sequence ID, spatial relation information of the SRS, and the like.

The spatial relation information of the SRS (for example, "spatialRelationInfo" of the RRC information element) may indicate spatial relation information between a certain reference signal and the SRS. The certain reference signal may be at least one of a synchronization signal/broadcast channel (Synchronization Signal/Physical Broadcast Channel (SS/PBCH)) block, a channel state information reference signal (CSI-RS), and an SRS (for example, another SRS). The SS/PBCH block may be referred to as a synchronization signal block (SSB).

The spatial relation information of the SRS may include, as an index of the certain reference signal, at least one of an SSB index, a CSI-RS resource ID, and an SRS resource ID.

Note that, in the present disclosure, an SSB index, an SSB resource ID, and an SSBRI (SSB Resource Indicator) may be interchangeably interpreted. A CSI-RS index, a CSI-RS resource ID, and a CRI (CSI-RS Resource Indicator) may be interchangeably interpreted. An SRS index, an SRS resource ID, and an SRI may be interchangeably interpreted.

The spatial relation information of the SRS may include a serving cell index, a BWP index (BWP ID), and the like corresponding to the certain reference signal.

In NR, transmission of the uplink signal may be controlled based on presence or absence of beam correspondence (BC). The BC may be, for example, a capability in which a certain node (for example, the base station or the UE) determines a beam (transmit beam, Tx beam) to be used for transmission of a signal, based on a beam (receive beam, Rx beam) used for reception of a signal.

Note that the BC may be referred to as transmit/receive beam correspondence (Tx/Rx beam correspondence), beam reciprocity, beam calibration, calibrated/non-calibrated, reciprocity calibrated/non-calibrated, a corresponding degree, a matching degree, or the like.

As shown in FIG. 1, with the gNB performing transmit beam sweeping by using beams B21 to B24 and the UE performing receive beam sweeping by using beams b1 to b4 in the BC, the gNB and the UE determine the beam B22 of the gNB as a DL transmit beam and determine the beam b2 of the UE as a DL receive beam, based on measurement results. The gNB uses the determined beam B22 as a UL receive beam as well, and the UE uses the determined beam b2 as a UL transmit beam as well.

For example, in a case without the BC, the UE may transmit the uplink signal (for example, the PUSCH, the PUCCH, the SRS, or the like) by using a beam (spatial domain transmission filter) that is the same as that for the SRS (or the SRS resource) indicated from the base station, based on measurement results of one or more SRSs (or SRS resources).

On the other hand, in a case with the BC, the UE may transmit the uplink signal (for example, the PUSCH, the PUCCH, the SRS, or the like) by using a beam (spatial domain transmission filter) that is the same as or that corresponds to a beam (spatial domain reception filter) used for reception of a certain SSB or CSI-RS (or CSI-RS resource).

In a case where, with respect to a certain SRS resource, the spatial relation information related to the SSB or the CSI-RS and the SRS is configured (for example, in the case with the BC), the UE may transmit the SRS resource by using the same spatial domain filter (spatial domain transmission filter) as the spatial domain filter (spatial domain reception filter) for reception of the SSB or the CSI-RS. In this case, the UE may assume that the UE receive beam of the SSB or the CSI-RS and the UE transmit beam of the SRS are the same.

In a case where, with respect to a certain SRS (target SRS) resource, the spatial relation information related to another SRS (reference SRS) and the SRS (target SRS) is configured (for example, in the case without the BC), the UE may transmit a target SRS resource by using the same spatial domain filter (spatial domain transmission filter) as the spatial domain filter (spatial domain transmission filter) for transmission of the reference SRS. In other words, in this case, the UE may assume that the UE transmit beam of the reference SRS and the UE transmit beam of the target SRS are the same.

The UE may determine the spatial relation of the PUSCH scheduled by using the DCI, based on the value of a certain field (for example, an SRS resource identifier (SRI) field) in the DCI (for example, DCI format 0_1). Specifically, for the PUSCH transmission, the UE may use the spatial relation information (for example, "spatialRelationInfo" of the RRC information element) of the SRS resource that is determined based on the value (for example, the SRI) of the certain field.

Problems

As described above, with respect to the PDCCH or the PDSCH, for the UE, a plurality of TCI states may be configured by using RRC, and one of the plurality of TCI states may be indicated by using a MAC CE or DCI. Therefore, beams can be promptly switched without performing RRC reconfiguration.

A maximum number (maxNrofTCI-States) of TCI states that can be configured by using the RRC is 128, and a maximum number (maxNrofTCI-StatesPDCCH) of TCI states for the PDCCH is 64.

With respect to the PUCCH, for the UE, eight spatial relations may be configured by using the RRC for one PUCCH resource, and one of the spatial relations may be indicated by using the MAC CE. The RRC reconfiguration is required to use spatial relations other than the eight spatial relations configured by using the RRC.

When the codebook-based transmission is used with respect to the PUSCH, for the UE, two SRS resources are configured by using the RRC, and one of the two SRS resources may be indicated by using the DCI (a field of 1 bit). When the noncodebook-based transmission is used with respect to the PUSCH, for the UE, four SRS resources may be configured by using the RRC, and one of the four SRS resources may be indicated by using the DCI (a field of 2 bits). The RRC reconfiguration is required to use spatial relations other than the two or four spatial relations configured by using the RRC.

The DL-RS can be configured for the spatial relation of the SRS resource used for the PUSCH. With respect to the SP-SRS, for the UE, the spatial relation of a plurality of (for example, up to 16) SRS resources can be configured by using the RRC, and one of the plurality of SRS resources can be indicated by using the MAC CE. With respect to the A-SRS and the P-SRS, for the UE, the spatial relation of the SRS resource cannot be indicated by using the MAC CE.

As described above, a large number of candidates for the spatial relation may need to be configured at one time as the spatial relation for UL transmission (the PUCCH, the PUSCH, or the SRS). For example, when the DL-RS (TCI state of the DL) is used as the spatial relation of the UL transmission by means of the beam correspondence, a large number of DL-RSs (for example, 32 SSBs) may be configured.

However, as described above, the number of candidates for the spatial relation that can be configured for the UL transmission at one time is limited, and is smaller than the number of candidates for the TCI state that can be configured for the DL channel at one time. In order to use the spatial relation that is not configured for the UL transmission, it is conceivable to configure another spatial relation through RRC reconfiguration. When the RRC reconfiguration is performed, however, a time period in which communication cannot be performed may be generated or resources may be consumed, for example, and performance of the system may be deteriorated.

In view of this, the inventors of the present invention came up with the idea that the UE assumes that spatial relation of specific uplink transmission is the same as a transmission configuration indication (TCI) state of a specific downlink channel or quasi-co-location (QCL) assumption.

In the present disclosure, specific UL transmission may be interpreted as a specific UL signal or a specific UL channel, or may be interpreted as at least one of the PUSCH, the PUCCH, and the SRS. The specific DL channel may be interpreted as at least one of the PDCCH and the PDSCH. The spatial relation may be interpreted as a spatial domain transmission filter, a spatial domain filter, a UE transmit beam, a UL transmit beam, a DL-RS, or the like. The TCI state may be interpreted as a TCI state or QCL assumption, QCL assumption, a spatial domain reception filter, a spatial domain filter, a UE receive beam, a DL receive beam, a DL-RS, or the like.

The TCI state may indicate a receive beam (spatial domain reception filter) indicated (configured) for the UE. The QCL assumption may indicate a receive beam (spatial domain reception filter) that is assumed by the UE, based on transmission or reception of an associated signal (for example, the PRACH).

Embodiments according to the present disclosure will be described in detail with reference to the drawings as follows. The radio communication method according to each embodiment may be employed independently or may be employed in combination.

Radio Communication Method

Embodiment 1

The UE may assume (may consider) that the spatial relation of specific UL transmission is the same as a TCI state of a specific DL channel or QCL assumption.

Figure 2:
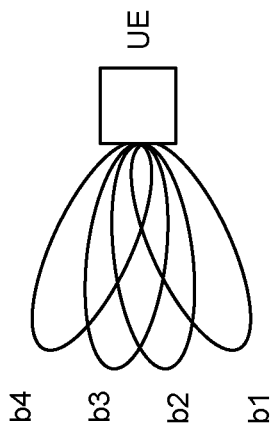
FIG. 2 is a diagram to show an example of spatial relation of specific UL transmission.

As shown in FIG. 2, the UE may use the TCI state of the specific DL channel (for example, the DL-RS, the spatial domain reception filter, the spatial domain filter, or the UE receive beam) as the spatial relation of the specific UL transmission (for example, the DL-RS, the spatial domain transmission filter, the spatial domain filter, or the UE transmit beam).

When the spatial relation (for example, spatialRelationInfo) of the SRS configuration information (SRS-config) is not configured, the UE may assume that the spatial relation of the specific UL transmission is the same as the TCI state of the specific DL channel.

In frequency range 1 (FR1, a frequency of 6 GHz or lower), the UE need not use analog beamforming for the UL transmission, or the spatial relation need not be configured for the UL transmission.

In frequency range 2 (FR2, a frequency higher than 6 GHz (or a frequency higher than 24 GHz)), the UE may assume that the spatial relation of the specific UL transmission is the same as the TCI state of the specific DL channel. In FR2, when the spatial relation of the SRS configuration information is not configured, the UE may assume that the spatial relation of the specific UL transmission is the same as the TCI state of the specific DL channel.

When the TCI state of the specific DL channel can be applied, the UE may assume that the spatial relation of the specific UL transmission is the same as the TCI state of the specific DL channel. When the TCI state of the specific DL channel can be applied and the spatial relation of the SRS configuration information is not configured, the UE may assume that the spatial relation of the specific UL transmission is the same as the TCI state of the specific DL channel.

In FR2, when the TCI state of the specific DL channel can be applied, the UE may assume that the spatial relation of the specific UL transmission is the same as the TCI state of the specific DL channel. In FR2, when the TCI state of the specific DL channel can be applied and the spatial relation of the SRS configuration information is not configured, the UE may assume that the spatial relation of the specific UL transmission is the same as the TCI state of the specific DL channel.

When a certain function according to Rel. 16 or a later version is configured, the UE may assume that the spatial relation of the specific UL transmission is the same as the TCI state of the specific DL channel. When the certain function is configured and the spatial relation of the SRS configuration information is not configured, the UE may assume that the spatial relation of the specific UL transmission is the same as the TCI state of the specific DL channel.

The certain function may be a function related to beams according to Rel. 16 or a later version. The certain function may be configured for the UE by using higher layer signaling. The function related to beams may be at least one of low latency beam selection, Layer 1 (L1)-Signal to Interference plus Noise Ratio (SINR) beam reporting (L1-SINR beam reporting), and BFR on a secondary cell (SCell) (BFR on SCell). The low latency beam selection may be referred to as fast beam selection, beam selection without the TCI state (beam selection w/o TCI state), beam selection type II, TCI state specification type 2, or the like. The L1-SINR beam reporting may be an operation in which the UE reports measurement results of the L1-SINR (CSI, L1-SINR corresponding to beams) for the sake of beam management. The BFR on SCell may be at least one of detection of beam failure (BF) in the SCell, transmission of a beam failure recovery request (BFRQ) to the SCell, and reception of a beam failure recovery (BFR) response from the SCell.

The specific configuration information (RRC information element) may indicate a specific parameter indicating that the spatial relation of the specific UL transmission is the same as the TCI state of the specific DL channel. When the specific parameter is configured by using the specific configuration information (when the specific configuration information indicates the specific parameter, or when the specific configuration information includes a field of the specific parameter), the UE may assume that the spatial relation of the specific UL transmission is the same as the TCI state of the specific DL channel. The specific parameter may be a parameter (for example, TCI state) indicating that the spatial relation of the specific UL transmission is the same as the TCI state of the specific DL channel, may be a parameter (for example, CORESET) indicating that the spatial relation of the specific UL transmission is the same as the TCI state of the CORESET, or may be a parameter (for example, ControlRS) indicating that the spatial relation of the specific UL transmission is the same as the reference signal (RS) used as the TCI state of the specific DL channel.

The specific configuration information may be the spatial relation information (for example, spatialRelationInfo or PUCCH-SpatialRelationInfo), reference signal information (referenceSignal) in the spatial relation information, or a type in the spatial relation information. For example, one of options of the pieces of reference signal information and the types may be the specific parameter.

The specific configuration information may be the spatial relation information (spatialRelationInfo) in the SRS resource information (SRS-Resource). When the specific parameter is configured by using the specific configuration information, the UE may assume that the spatial relation of the SRS is the same as the TCI state of the specific DL channel.

When the SRS resource set information (SRS-ResourceSet) in the SRS configuration information (SRS-Config) indicates the use for the codebook-based transmission or the noncodebook-based transmission (the usage in the SRS resource set information indicates the codebook or the noncodebook), and the specific parameter is configured by using the spatial relation information (spatialRelationInfo) in the SRS resource information (SRS-Resource) indicating the SRS resource in the SRS resource set, the UE may assume that the spatial relation of the PUSCH is the same as the TCI state of the specific DL channel.

The specific configuration information may be the PUCCH spatial relation information (PUCCH-SpatialRelationInfo) in the PUCCH configuration information (PUCCH-Config). When the specific parameter is configured by using the PUCCH spatial relation information, the UE may assume that the spatial relation of the PUCCH is the same as the TCI state of the specific DL channel.

The TCI state of the specific DL channel may be interpreted as an active TCI state (activated TCI state), an active TCI state or QCL assumption, or the like.

A plurality of TCI states may be active for the specific DL channel. The TCI state of the specific DL channel may be interpreted as the TCI state or the QCL assumption of the CORESET that has the lowest CORESET-ID in the latest slot and that is associated with a monitored search space, or may be interpreted as the TCI state or the QCL assumption (for example, a default TCI state) of the DL channel that corresponds to the UL transmission (that is used to trigger the UL transmission, or that is used to schedule the UL transmission).

For example, when the specific UL transmission is the PUCCH, the specific DL channel may be the PDCCH that corresponds to the PUCCH or may be the PDSCH that corresponds to a HARQ-ACK carried on the PUCCH. When the specific UL transmission is the A-SRS, the specific DL channel may be the PDCCH that is used to trigger the A-SRS. When the specific UL transmission is the UL transmission that is triggered by using a MAC CE, such as an SP-SRS, the specific DL channel may be the PDCCH that is used to schedule the MAC CE or may be the PDSCH that carries the MAC CE.

The specific UL transmission may be at least one of the PUSCH and the SRS. With this configuration, changes in the specifications can be reduced. For the PUCCH, the number of spatial relations configured by using the PUCCH configuration information may be increased (for example, Embodiment 2 to be described later).

As the cases in which the spatial relation of the SRS configuration information is not configured for the UE, at least one of the following Embodiments 1-1 to 1-3 may be used.

Embodiment 1-1

When a specific field is absent in the specific higher layer parameter (for example, the RRC information element), the UE may assume that the spatial relation of the SRS is the same as the TCI state of the specific DL channel.

When a specific field is absent in the SRS resource information (SRS-Resource) in the SRS configuration information (SRS-Config), the UE may assume that the spatial relation of the SRS is the same as the active TCI state of the specific DL channel. The specific field may be the spatial relation information (spatialRelationInfo) being a configuration of the spatial relation between the reference RS (for example, the SSB, the CSI-RS, or the SRS) and the target SRS.

When the SRS resource set information (SRS-ResourceSet) in the SRS configuration information (SRS-Config) indicates the use for the codebook-based transmission or the noncodebook-based transmission (the usage in the SRS resource set information indicates the codebook or the noncodebook), and the specific field is absent in the SRS resource information (SRS-Resource) indicating the SRS resource in the SRS resource set, the UE may assume that the spatial relation of the PUSCH is the same as the active TCI state of the specific DL channel. The specific field may be the spatial relation information (spatialRelationInfo).

When the specific field is absent in the PUCCH configuration information (PUCCH-Config), the UE may assume that the spatial relation of the PUCCH is the same as the active TCI state of the specific DL channel. The specific field may be an element of a list (spatialRelationInfoToAddModList). The element may be the PUCCH spatial relation information (PUCCH-SpatialRelationInfo) used to configure spatial setting for PUCCH transmission.

Embodiment 1-2

When a specific higher layer parameter is not configured, the UE may assume that the spatial relation of the SRS is the same as the TCI state of the specific DL channel.

The specific higher layer parameter may be a specific RRC information element, or may be a higher layer parameter (spatialRelationInfo) of the spatial relation information.

An SRS parameter (the higher layer parameter (spatialRelationInfo) of the spatial relation information being a configuration of the spatial relation between the reference RS and the target SRS) may be semi-statically configured by using the higher layer parameter (SRS-Resource) of the SRS resource.

When the higher layer parameter spatialRelationInfo is configured, the higher layer parameter spatialRelationInfo may include an ID of the reference RS. The reference RS may be the SS/PBCH block, the CSI-RS, or the SRS. When the higher layer parameter (servingCellId) of a serving cell ID is present, the CSI-RS may be configured in the serving cell that is indicated by the higher layer parameter. The SRS may be configured in a UL BWP that is indicated by the higher layer parameter (uplinkBWP) of the UL BWP. Alternatively, when the higher layer parameter (servingCellId) of the serving cell ID is present, the SRS may be configured in the serving cell that is indicated by the higher layer parameter; otherwise, the SRS may be configured in the same serving cell as the target SRS.

When the higher layer parameter spatialRelationInfo is not configured, the UE may assume that the spatial relation is the same as the active TCI state of the specific DL channel.

When the higher layer parameter spatialRelationInfo is not configured, the UE may assume that the spatial relation is the same as the active TCI state of the specific DL channel, or the TCI state or the QCL assumption of the CORESET that has the lowest CORESET-ID in the latest slot and that is associated with a monitored search space.

Embodiment 1-3

When a specific higher layer parameter for a specific type is not configured, the UE may assume that the spatial relation of the SRS is the same as the TCI state of the specific DL channel. The specific type may be at least one of the P-SRS, the SP-SRS, and the A-SRS, or may be specified by using the higher layer parameter (resourceType) of a resource type in the SRS resource information.

P-SRS

The following is a description of a case in which the SRS resource information (SRS-Resource) indicates a P-SRS for the UE for which one or more SRS resource configurations are configured (a case in which the higher layer parameter (resourceType) of the resource type in the SRS resource information indicates "periodic").

When the higher layer parameter spatialRelationInfo including an ID (ssb-Index) of a reference SS/PBCH block is configured for the UE, the UE may transmit the target SRS resource including the same spatial domain transmission filter as that used in the reception of the reference SS/PBCH block. When the higher layer parameter spatialRelationInfo including an ID (csi-RS-Index) of a reference CSI-RS is configured for the UE, the UE may transmit the target SRS resource including the same spatial domain transmission filter as that used in the reception of the periodic CSI-RS of a reference or the semi-persistent CSI-RS of a reference. When the higher layer parameter spatialRelationInfo including an ID (srs) of a reference SRS is configured for the UE, the UE may transmit the target SRS resource including the same spatial domain transmission filter as that used in the transmission of the P-SRS of a reference.

When the higher layer parameter spatialRelationInfo is not configured, the UE may assume that the spatial relation is the same as the active TCI state of the specific DL channel.

When the higher layer parameter spatialRelationInfo is not configured, the UE may assume that the spatial relation is the same as the TCI state or the QCL assumption of the CORESET that has the lowest CORESET-ID in the latest slot and that is associated with a monitored search space.

SP-SRS

The following is a description of a case in which the SRS resource information (SRS-Resource) indicates the SP-SRS for the UE for which one or more SRS resource configurations are configured (a case in which the higher layer parameter (resourceType) of the resource type in the SRS resource information indicates "semi-persistent").

When the UE receives an activation command for the SRS resource and the HARQ-ACK corresponding to the PDSCH for carrying a selection command is transmitted in slot n, a corresponding operation and an assumption of the UE on SRS transmission corresponding to a configured SRS resource set may be applied from slot n+3N+1 (N represents the number of slots in a subframe). The activation command may include a spatial relation assumption that is provided by a list of references to one reference signal ID for each element of an activated SRS resource set. Each ID in the list may refer to the SS/PBCH block, the NZP CSI-RS resource, or the SRS resource of the reference. When a resource serving cell ID field is present in the activation command, the NZP CSI-RS resource of the reference may be an NZP CSI-RS resource configured in the serving cell that is indicated by the resource serving cell ID field; otherwise, the NZP CSI-RS resource of the reference may be an NZP CSI-RS resource configured in the same serving cell as the SRS resource set. When a resource serving cell ID and a resource BWP ID are present in the activation command, the SRS resource of the reference may be an SRS resource configured in the serving cell and the UL BWP that are indicated by the resource serving cell ID and the resource BWP ID; otherwise, the SRS resource of the reference may be an SRS resource configured in the same serving cell and BWP as the SRS resource set.

When the higher layer parameter spatialRelationInfo including an ID (ssb-Index) of a reference SS/PBCH block is configured for the UE, the UE may transmit the target SRS resource including the same spatial domain transmission filter as that used in the reception of the reference SS/PBCH block. When the higher layer parameter spatialRelationInfo including an ID (csi-RS-Index) of a reference CSI-RS is configured for the UE, the UE may transmit the target SRS resource including what is used in the reception of the periodic CSI-RS of a reference or the semi-persistent CSI-RS of a reference and the spatial domain transmission filter. When the higher layer parameter spatialRelationInfo including an ID (srs) of a reference SRS is configured for the UE, the UE may transmit the target SRS resource including the same spatial domain transmission filter as that used in the transmission of the P-SRS of a reference or the SP-SRS of a reference.

When none of the pieces of the higher layer parameter spatialRelationInfo is configured or none of the pieces of the higher layer parameter spatialRelationInfo is activated, the UE may assume that the spatial relation is the same as the active TCI state of the specific DL channel.

When none of the pieces of the higher layer parameter spatialRelationInfo is configured or none of the pieces of the higher layer parameter spatialRelationInfo is activated, the UE may assume that the spatial relation is the same as the TCI state or the QCL assumption of the CORESET that has the lowest CORESET-ID in the latest slot and that is associated with a monitored search space.

A-SRS

The following is a description of a case in which the SRS resource information (SRS-Resource) indicates the A-SRS for the UE for which one or more SRS resource configurations are configured (a case in which the higher layer parameter (resourceType) of the resource type in the SRS resource information indicates "aperiodic").

When the higher layer parameter spatialRelationInfo including an ID (ssb-Index) of a reference SS/PBCH block is configured for the UE, the UE may transmit the target SRS resource including the same spatial domain transmission filter as that used in the reception of the reference SS/PBCH block. When the higher layer parameter spatialRelationInfo including an ID (csi-RS-Index) of a reference CSI-RS is configured for the UE, the UE may transmit the target SRS resource including what is used in the reception of the periodic CSI-RS of a reference, the semi-persistent (SP)-CSI-RS of a reference, or the latest aperiodic CSI-RS of a reference and the spatial domain transmission filter. When the higher layer parameter spatialRelationInfo including an ID (srs) of a reference SRS is configured for the UE, the UE may transmit the target SRS resource including the same spatial domain transmission filter as that used in the transmission of the P-SRS of a reference, the SP-SRS of a reference, or the A-SRS of a reference.

When the higher layer parameter spatialRelationInfo is not configured, the UE may assume that the spatial relation is the same as the active TCI state of the specific DL channel.

When the higher layer parameter spatialRelationInfo is not configured, the UE may assume that the spatial relation is the same as the TCI state or the QCL assumption of the CORESET that has the lowest CORESET-ID in the latest slot and that is associated with a monitored search space.

When the higher layer parameter spatialRelationInfo is not configured, the UE may assume that the spatial relation is the same as the TCI state or the QCL assumption of the PDCCH that is used to trigger the A-SRS.

According to Embodiment 1 described above, when the active TCI state of the specific DL channel is updated by using a MAC CE or DCI, the spatial relation of the specific UL transmission can be updated. This eliminates the need for performing the RRC reconfiguration, and allows prompt control of the spatial relation of the specific UL transmission. Therefore, communication characteristics of the specific UL transmission can be enhanced. Overhead of signaling for the spatial relation and interruption in the communication can be avoided.

The following has been under study: a maximum number of a total number of active spatial relations being the DL-RS unique to the (aperiodic NZP CSI-RS), the SRS without a configuration of the spatial relation, and the TCI state available for DCI triggering of the aperiodic NZP CSI-RS, for indication of the spatial domain transmission filter for the PUCCH and the SRS for the PUSCH for each CC and for each BWP in the UE capability information is at least 1. The following has also been under study: when the maximum number of the active spatial relations is 1, one additional active spatial relation for the PUCCH is supported. According to Embodiment 1, the total number of active spatial relations can be maintained to be 1, and the UE can operate in accordance with the UE capability information.

Embodiment 2

Two or more PUCCH resources in one PUCCH resource set may indicate the same resource. The PUCCH configuration information may include two or more PUCCH spatial relation information lists (spatialRelationInfoToAddModList). The two or more PUCCH resources may be associated with different PUCCH spatial relation information lists.

For the UE, one piece of spatial relation information in a corresponding PUCCH spatial relation information list may be indicated (may be activated) with respect to each of the two or more PUCCH resources by using the MAC CE. With this configuration, for the UE, different pieces of PUCCH spatial relation information may be indicated with respect to the two or more PUCCH resources.

The UE may determine one PUCCH resource in the PUCCH resource set, based on at least one of the value of the PUCCH resource indicator field in the DCI, the number ($N_{CCE}$) of CCEs in the control resource set (CORESET) for PDCCH reception used for carrying the DCI, and the index ($n_{CCE,0}$) of the first CCE in the PDCCH reception.

For example, PUCCH resources #0 and #1 in one PUCCH resource set may indicate the same resource. The PUCCH spatial relation information list including pieces of PUCCH spatial relation information #0, #1, #2, #3, #4, #5, #6, and #7 may be associated with PUCCH resource #0, and the PUCCH spatial relation information list including pieces of PUCCH spatial relation information #8, #9, #10, #11, #12, #13, #14, and #15 may be associated with PUCCH resource #1.

For the UE, one piece of PUCCH spatial relation information in a corresponding PUCCH spatial relation information list may be indicated with respect to each of PUCCH resources #0 and #1 by using the MAC CE, and PUCCH resources #0 and #1 may be indicated by using the PDCCH. With this configuration, for the UE, the same resource can be indicated regardless of whether PUCCH resource #0 or #1 is indicated, and one of 16 pieces of PUCCH spatial relation information can be indicated.

For example, eight PUCCH resources in one PUCCH resource set may indicate the same resource. Different PUCCH spatial relation information lists may be associated with different PUCCH resources. In this case, for the UE, one of 64 (=8×8) pieces of PUCCH spatial relation information can be indicated by using the MAC CE and the PDCCH.

According to Embodiment 2, more than eight pieces of PUCCH spatial relation information can be promptly switched without performing the RRC reconfiguration.

Radio Communication System

Hereinafter, a structure of a radio communication system according to one embodiment of the present disclosure will be described. In this radio communication system, the radio communication method according to each embodiment of the present disclosure described above may be used alone or may be used in combination for communication.

Figure 3:
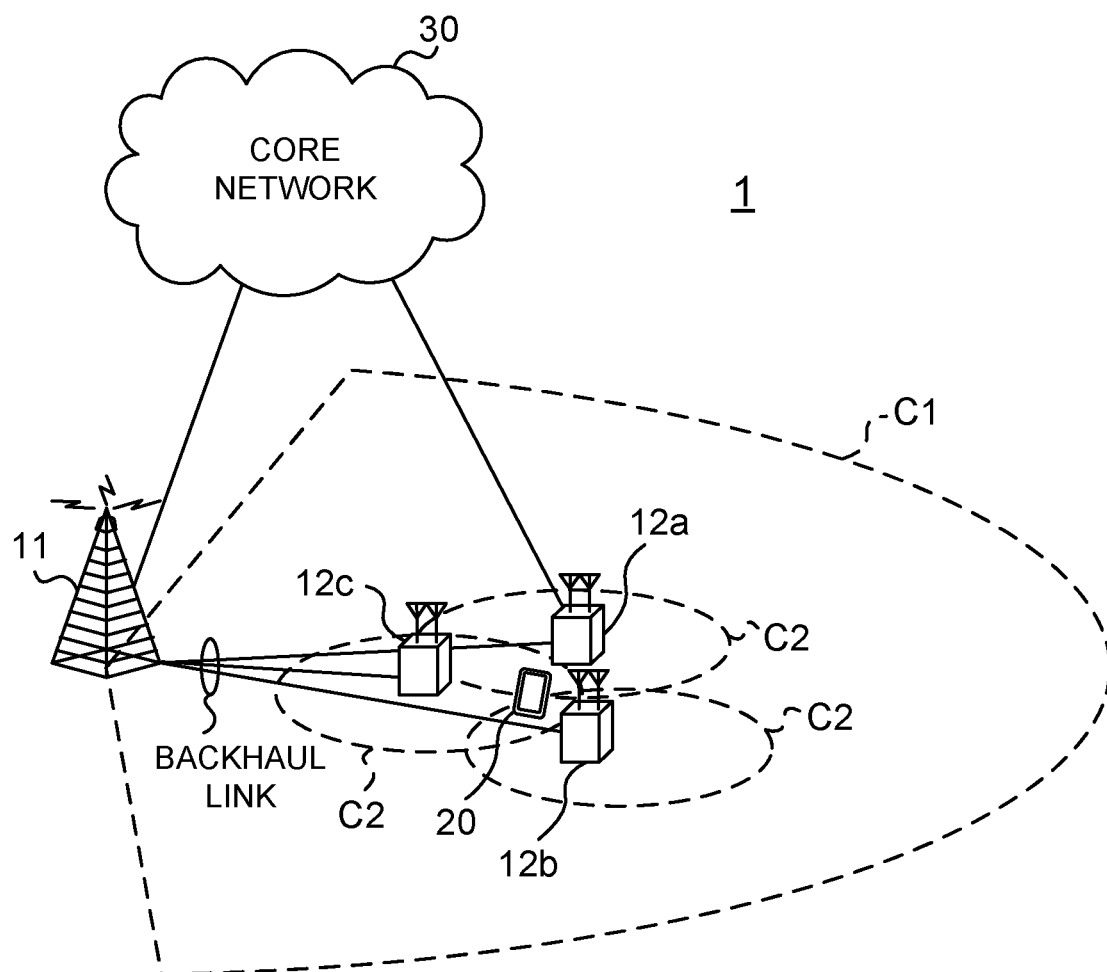
FIG. 3 is a diagram to show an example of a schematic structure of a radio communication system according to one embodiment.

FIG. 3 is a diagram to show an example of a schematic structure of the radio communication system according to one embodiment. The radio communication system 1 may be a system implementing a communication using Long Term Evolution (LTE), 5th generation mobile communication system New Radio (5G NR), and so on the specifications of which have been drafted by Third Generation Partnership Project (3GPP).

The radio communication system 1 may support dual connectivity (multi-RAT dual connectivity (MR-DC)) between a plurality of Radio Access Technologies (RATs). The MR-DC may include dual connectivity (E-UTRA-NR Dual Connectivity (EN-DC)) between LTE (Evolved Universal Terrestrial Radio Access (E-UTRA)) and NR, dual connectivity (NR-E-UTRA Dual Connectivity (NE-DC)) between NR and LTE, and so on.

In EN-DC, a base station (eNB) of LTE (E-UTRA) is a master node (MN), and a base station (gNB) of NR is a secondary node (SN). In NE-DC, a base station (gNB) of NR is an MN, and a base station (eNB) of LTE (E-UTRA) is an SN.

The radio communication system 1 may support dual connectivity between a plurality of base stations in the same RAT (for example, dual connectivity (NR-NR Dual Connectivity (NN-DC)) where both of an MN and an SN are base stations (gNB) of NR).

The radio communication system 1 may include a base station 11 that forms a macro cell C1 of a relatively wide coverage, and base stations 12 (12a to 12c) that form small cells C2, which are placed within the macro cell C1 and which are narrower than the macro cell C1. The user terminal 20 may be located in at least one cell. The arrangement, the number, and the like of each cell and user terminal 20 are by no means limited to the aspect shown in the diagram. Hereinafter, the base stations 11 and 12 will be collectively referred to as "base stations 10," unless specified otherwise.

The user terminal 20 may be connected to at least one of the plurality of base stations 10. The user terminal 20 may use at least one of carrier aggregation (CA) and dual connectivity (DC) using a plurality of component carriers (CCs).

Each CC may be included in at least one of a first frequency band (Frequency Range 1 (FR1)) and a second frequency band (Frequency Range 2 (FR2)). The macro cell C1 may be included in FR1, and the small cells C2 may be included in FR2. For example, FR1 may be a frequency band of 6 GHz or less (sub-6 GHz), and FR2 may be a frequency band which is higher than 24 GHz (above-24 GHz). Note that frequency bands, definitions, and so on of FR1 and FR2 are by no means limited to these, and for example, FR1 may correspond to a frequency band which is higher than FR2.

The user terminal 20 may communicate using at least one of time division duplex (TDD) and frequency division duplex (FDD) in each CC.

The plurality of base stations 10 may be connected by a wired connection (for example, optical fiber in compliance with the Common Public Radio Interface (CPRI), the X2 interface, and so on) or a wireless connection (for example, an NR communication). For example, if an NR communication is used as a backhaul between the base stations 11 and 12, the base station 11 corresponding to a higher station may be referred to as an "Integrated Access Backhaul (IAB) donor," and the base station 12 corresponding to a relay station (relay) may be referred to as an "IAB node."

The base station 10 may be connected to a core network 30 through another base station 10 or directly. For example, the core network 30 may include at least one of Evolved Packet Core (EPC), 5G Core Network (5GCN), Next Generation Core (NGC), and so on.

The user terminal 20 may be a terminal supporting at least one of communication schemes such as LTE, LTE-A, 5G, and so on.

In the radio communication system 1, an orthogonal frequency division multiplexing (OFDM)-based wireless access scheme may be used. For example, in at least one of the downlink (DL) and the uplink (UL), Cyclic Prefix OFDM (CP-OFDM), Discrete Fourier Transform Spread OFDM (DFT-s-OFDM), Orthogonal Frequency Division Multiple Access (OFDMA), Single Carrier Frequency Division Multiple Access (SC-FDMA), and so on may be used.

The wireless access scheme may be referred to as a "waveform." Note that, in the radio communication system 1, another wireless access scheme (for example, another single carrier transmission scheme, another multi-carrier transmission scheme) may be used for a wireless access scheme in the UL and the DL.

In the radio communication system 1, a downlink shared channel (Physical Downlink Shared Channel (PDSCH)), which is used by each user terminal 20 on a shared basis, a broadcast channel (Physical Broadcast Channel (PBCH)), a downlink control channel (Physical Downlink Control Channel (PDCCH)), and so on, may be used as downlink channels.

In the radio communication system 1, an uplink shared channel (Physical Uplink Shared Channel (PUSCH)), which is used by each user terminal 20 on a shared basis, an uplink control channel (Physical Uplink Control Channel (PUCCH)), a random access channel (Physical Random Access Channel (PRACH)), and so on may be used as uplink channels.

User data, higher layer control information, System Information Blocks (SIBs), and so on are communicated on the PDSCH. User data, higher layer control information, and so on may be communicated on the PUSCH. The Master Information Blocks (MIBs) may be communicated on the PBCH.

Lower layer control information may be communicated on the PDCCH. For example, the lower layer control information may include downlink control information (DCI) including scheduling information of at least one of the PDSCH and the PUSCH.

Note that DCI for scheduling the PDSCH may be referred to as "DL assignment," "DL DCI," and so on, and DCI for scheduling the PUSCH may be referred to as "UL grant," "UL DCI," and so on. Note that the PDSCH may be interpreted as "DL data," and the PUSCH may be interpreted as "UL data."

For detection of the PDCCH, a control resource set (CORESET) and a search space may be used. The CORESET corresponds to a resource to search DCI. The search space corresponds to a search area and a search method of PDCCH candidates. One CORESET may be associated with one or more search spaces. The UE may monitor a CORESET associated with a certain search space, based on search space configuration.

One search space may correspond to a PDCCH candidate corresponding to one or more aggregation levels. One or more search spaces may be referred to as a "search space set." Note that a "search space," a "search space set," a "search space configuration," a "search space set configuration," a "CORESET," a "CORESET configuration," and so on of the present disclosure may be interchangeably interpreted.

Uplink control information (UCI) including at least one of channel state information (CSI), transmission confirmation information (for example, which may be also referred to as Hybrid Automatic Repeat reQuest ACKnowledgement (HARQ-ACK), ACK/NACK, and so on), and scheduling request (SR) may be communicated by means of the PUCCH. By means of the PRACH, random access preambles for establishing connections with cells may be communicated.

Note that the downlink, the uplink, and so on in the present disclosure may be expressed without a term of "link." In addition, various channels may be expressed without adding "Physical" to the head.

In the radio communication system 1, a synchronization signal (SS), a downlink reference signal (DL-RS), and so on may be communicated. In the radio communication system 1, a cell-specific reference signal (CRS), a channel state information reference signal (CSI-RS), a demodulation reference signal (DMRS), a positioning reference signal (PRS), a phase tracking reference signal (PTRS), and so on may be communicated as the DL-RS.

For example, the synchronization signal may be at least one of a primary synchronization signal (PSS) and a secondary synchronization signal (SSS). A signal block including an SS (PSS, SSS) and a PBCH (and a DMRS for a PBCH) may be referred to as an "SS/PBCH block," an "SS Block (SSB)," and so on. Note that an SS, an SSB, and so on may be also referred to as a "reference signal."

In the radio communication system 1, a sounding reference signal (SRS), a demodulation reference signal (DMRS), and so on may be communicated as an uplink reference signal (UL-RS). Note that DMRS may be referred to as a "user terminal specific reference signal (UE-specific Reference Signal)."

Base Station

Figure 4:
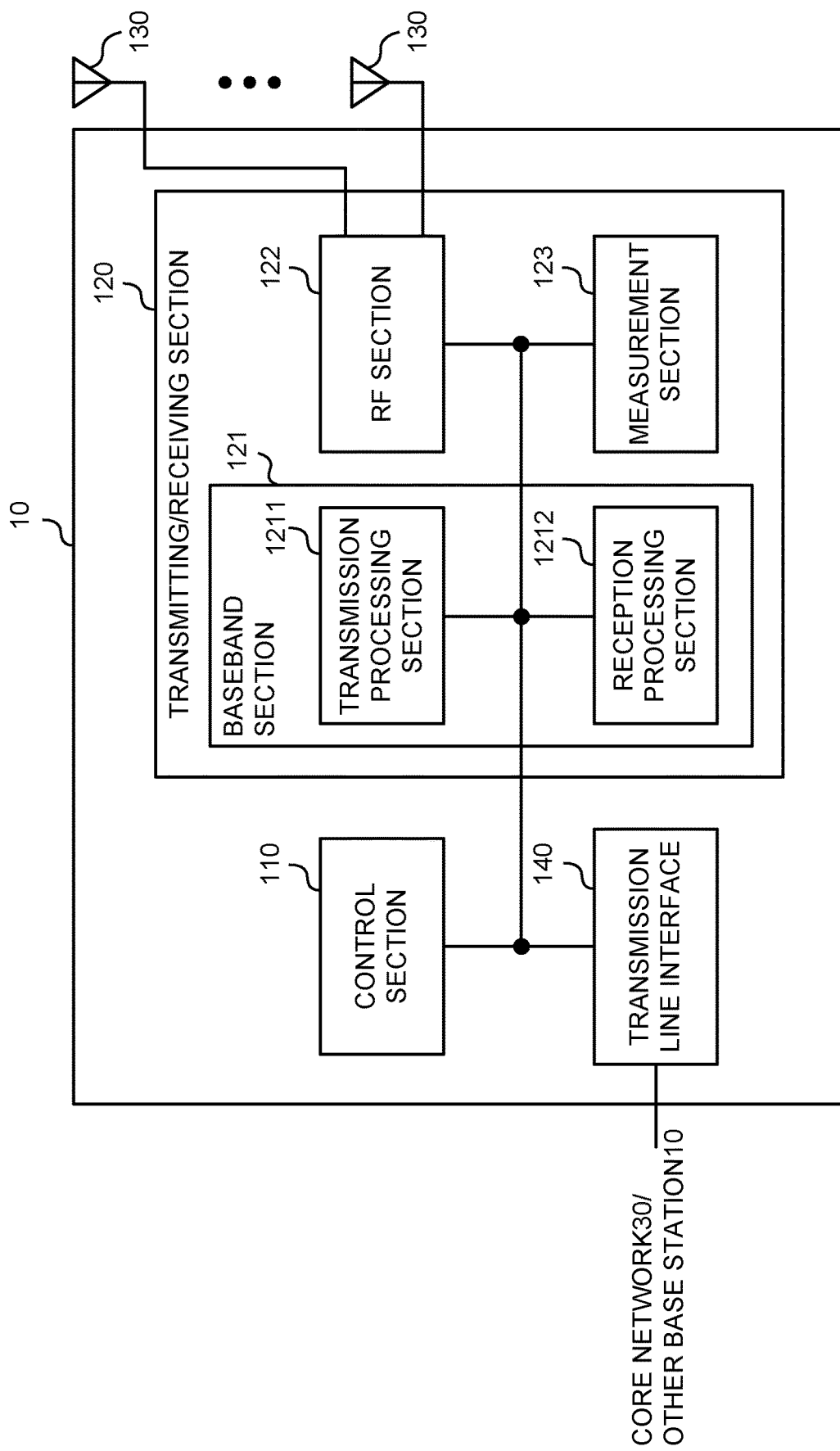
FIG. 4 is a diagram to show an example of a structure of a base station according to one embodiment.

FIG. 4 is a diagram to show an example of a structure of the base station according to one embodiment. The base station 10 includes a control section 110, a transmitting/receiving section 120, transmitting/receiving antennas 130 and a communication path interface 140. Note that the base station 10 may include one or more control sections 110, one or more transmitting/receiving sections 120, one or more transmitting/receiving antennas 130, and one or more communication path interfaces 140.

Note that, the present example primarily shows functional blocks that pertain to characteristic parts of the present embodiment, and it is assumed that the base station 10 may include other functional blocks that are necessary for radio communication as well. Part of the processes of each section described below may be omitted.

The control section 110 controls the whole of the base station 10. The control section 110 can be constituted with a controller, a control circuit, or the like described based on general understanding of the technical field to which the present disclosure pertains.

The control section 110 may control generation of signals, scheduling (for example, resource allocation, mapping), and so on. The control section 110 may control transmission and reception, measurement, and so on using the transmitting/receiving section 120, the transmitting/receiving antennas 130, and the communication path interface 140. The control section 110 may generate data, control information, a sequence, and so on to transmit as a signal, and forward the generated items to the transmitting/receiving section 120. The control section 110 may perform call processing (setting up, releasing) for communication channels, manage the state of the base station 10, and manage the radio resources.

The transmitting/receiving section 120 may include a baseband section 121, a Radio Frequency (RF) section 122, and a measurement section 123. The baseband section 121 may include a transmission processing section 1211 and a reception processing section 1212. The transmitting/receiving section 120 can be constituted with a transmitter/receiver, an RF circuit, a baseband circuit, a filter, a phase shifter, a measurement circuit, a transmitting/receiving circuit, or the like described based on general understanding of the technical field to which the present disclosure pertains.

The transmitting/receiving section 120 may be structured as a transmitting/receiving section in one entity, or may be constituted with a transmitting section and a receiving section. The transmitting section may be constituted with the transmission processing section 1211, and the RF section 122. The receiving section may be constituted with the reception processing section 1212, the RF section 122, and the measurement section 123.

The transmitting/receiving antennas 130 can be constituted with antennas, for example, an array antenna, or the like described based on general understanding of the technical field to which the present disclosure pertains.

The transmitting/receiving section 120 may transmit the above-described downlink channel, synchronization signal, downlink reference signal, and so on. The transmitting/receiving section 120 may receive the above-described uplink channel, uplink reference signal, and so on.

The transmitting/receiving section 120 may form at least one of a transmit beam and a receive beam by using digital beam forming (for example, precoding), analog beam forming (for example, phase rotation), and so on.

The transmitting/receiving section 120 (transmission processing section 1211) may perform the processing of the Packet Data Convergence Protocol (PDCP) layer, the processing of the Radio Link Control (RLC) layer (for example, RLC retransmission control), the processing of the Medium Access Control (MAC) layer (for example, HARQ retransmission control), and so on, for example, on data and control information and so on acquired from the control section 110, and may generate bit string to transmit.

The transmitting/receiving section 120 (transmission processing section 1211) may perform transmission processing such as channel coding (which may include error correction coding), modulation, mapping, filtering, discrete Fourier transform (DFT) processing (as necessary), inverse fast Fourier transform (IFFT) processing, precoding, digital-to-analog conversion, and so on, on the bit string to transmit, and output a baseband signal.

The transmitting/receiving section 120 (RF section 122) may perform modulation to a radio frequency band, filtering, amplification, and so on, on the baseband signal, and transmit the signal of the radio frequency band through the transmitting/receiving antennas 130.

On the other hand, the transmitting/receiving section 120 (RF section 122) may perform amplification, filtering, demodulation to a baseband signal, and so on, on the signal of the radio frequency band received by the transmitting/receiving antennas 130.

The transmitting/receiving section 120 (reception processing section 1212) may apply reception processing such as analog-digital conversion, fast Fourier transform (FFT)

processing, inverse discrete Fourier transform (IDFT) processing (as necessary), filtering, de-mapping, demodulation, decoding (which may include error correction decoding), MAC layer processing, the processing of the RLC layer and the processing of the PDCP layer, and so on, on the acquired baseband signal, and acquire user data, and so on.

The transmitting/receiving section 120 (measurement section 123) may perform the measurement related to the received signal. For example, the measurement section 123 may perform Radio Resource Management (RRM) measurement, Channel State Information (CSI) measurement, and so on, based on the received signal. The measurement section 123 may measure a received power (for example, Reference Signal Received Power (RSRP)), a received quality (for example, Reference Signal Received Quality (RSRQ), a Signal to Interference plus Noise Ratio (SINR), a Signal to Noise Ratio (SNR)), a signal strength (for example, Received Signal Strength Indicator (RSSI)), channel information (for example, CSI), and so on. The measurement results may be output to the control section 110.

The communication path interface 140 may perform transmission/reception (backhaul signaling) of a signal with an apparatus included in the core network 30 or other base stations 10, and so on, and acquire or transmit user data (user plane data), control plane data, and so on for the user terminal 20.

Note that the transmitting section and the receiving section of the base station 10 in the present disclosure may be constituted with at least one of the transmitting/receiving section 120, the transmitting/receiving antennas 130, and the communication path interface 140.

Note that the transmitting/receiving section 120 may transmit a reference signal (for example, an SSB, a CSI-RS, or the like). The transmitting/receiving section 120 may transmit information (the MAC CE or the DCI) for indicating the TCI state for the specific DL channel.

User Terminal

Figure 5:
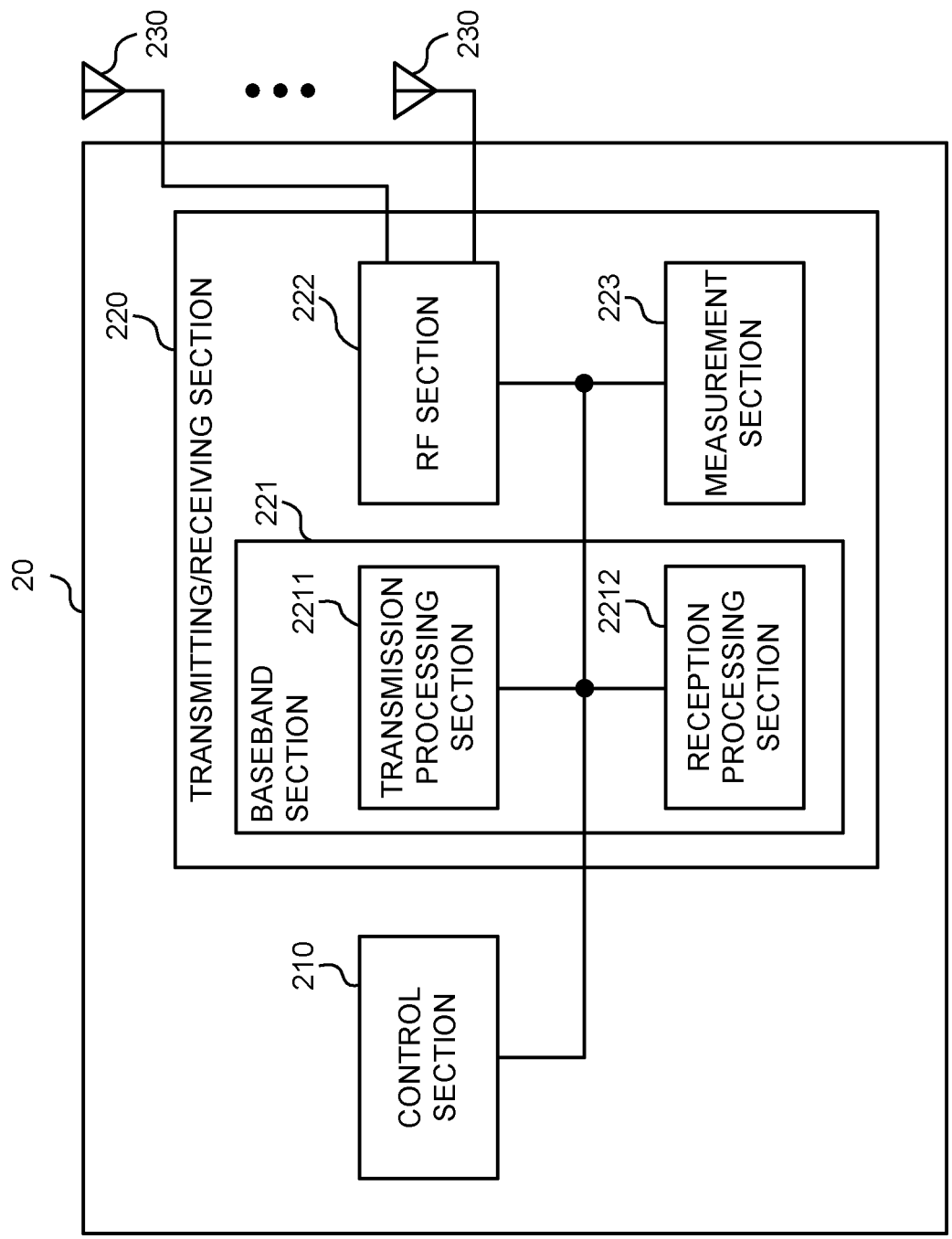
FIG. 5 is a diagram to show an example of a structure of a user terminal according to one embodiment.

FIG. 5 is a diagram to show an example of a structure of the user terminal according to one embodiment. The user terminal 20 includes a control section 210, a transmitting/receiving section 220, and transmitting/receiving antennas 230. Note that the user terminal 20 may include one or more control sections 210, one or more transmitting/receiving sections 220, and one or more transmitting/receiving antennas 230.

Note that, the present example primarily shows functional blocks that pertain to characteristic parts of the present embodiment, and it is assumed that the user terminal 20 may include other functional blocks that are necessary for radio communication as well. Part of the processes of each section described below may be omitted.

The control section 210 controls the whole of the user terminal 20. The control section 210 can be constituted with a controller, a control circuit, or the like described based on general understanding of the technical field to which the present disclosure pertains.

The control section 210 may control generation of signals, mapping, and so on. The control section 210 may control transmission/reception, measurement, and so on using the transmitting/receiving section 220, and the transmitting/receiving antennas 230. The control section 210 generates data, control information, a sequence, and so on to transmit as a signal, and may forward the generated items to the transmitting/receiving section 220.

The transmitting/receiving section 220 may include a baseband section 221, an RF section 222, and a measurement section 223. The baseband section 221 may include a transmission processing section 2211 and a reception processing section 2212. The transmitting/receiving section 220 can be constituted with a transmitter/receiver, an RF circuit, a baseband circuit, a filter, a phase shifter, a measurement circuit, a transmitting/receiving circuit, or the like described based on general understanding of the technical field to which the present disclosure pertains.

The transmitting/receiving section 220 may be structured as a transmitting/receiving section in one entity, or may be constituted with a transmitting section and a receiving section. The transmitting section may be constituted with the transmission processing section 2211, and the RF section 222. The receiving section may be constituted with the reception processing section 2212, the RF section 222, and the measurement section 223.

The transmitting/receiving antennas 230 can be constituted with antennas, for example, an array antenna, or the like described based on general understanding of the technical field to which the present disclosure pertains.

The transmitting/receiving section 220 may receive the above-described downlink channel, synchronization signal, downlink reference signal, and so on. The transmitting/receiving section 220 may transmit the above-described uplink channel, uplink reference signal, and so on.

The transmitting/receiving section 220 may form at least one of a transmit beam and a receive beam by using digital beam forming (for example, precoding), analog beam forming (for example, phase rotation), and so on.

The transmitting/receiving section 220 (transmission processing section 2211) may perform the processing of the PDCP layer, the processing of the RLC layer (for example, RLC retransmission control), the processing of the MAC layer (for example, HARQ retransmission control), and so on, for example, on data and control information and so on acquired from the control section 210, and may generate bit string to transmit.

The transmitting/receiving section 220 (transmission processing section 2211) may perform transmission processing such as channel coding (which may include error correction coding), modulation, mapping, filtering, DFT processing (as necessary), IFFT processing, precoding, digital-to-analog conversion, and so on, on the bit string to transmit, and output a baseband signal.

Note that, whether to apply DFT processing or not may be based on the configuration of the transform precoding. The transmitting/receiving section 220 (transmission processing section 2211) may perform, for a certain channel (for example, PUSCH), the DFT processing as the above-described transmission processing to transmit the channel by using a DFT-s-OFDM waveform if transform precoding is enabled, and otherwise, does not need to perform the DFT processing as the above-described transmission process.

The transmitting/receiving section 220 (RF section 222) may perform modulation to a radio frequency band, filtering, amplification, and so on, on the baseband signal, and transmit the signal of the radio frequency band through the transmitting/receiving antennas 230.

On the other hand, the transmitting/receiving section 220 (RF section 222) may perform amplification, filtering, demodulation to a baseband signal, and so on, on the signal of the radio frequency band received by the transmitting/receiving antennas 230.

The transmitting/receiving section 220 (reception processing section 2212) may apply a receiving process such as analog-digital conversion, FFT processing, IDFT processing (as necessary), filtering, de-mapping, demodulation, decoding (which may include error correction decoding), MAC layer processing, the processing of the RLC layer and the processing of the PDCP layer, and so on, on the acquired baseband signal, and acquire user data, and so on.

The transmitting/receiving section 220 (measurement section 223) may perform the measurement related to the received signal. For example, the measurement section 223 may perform RRM measurement, CSI measurement, and so on, based on the received signal. The measurement section 223 may measure a received power (for example, RSRP), a received quality (for example, RSRQ, SINR, SNR), a signal strength (for example, RSSI), channel information (for example, CSI), and so on. The measurement results may be output to the control section 210.

Note that the transmitting section and the receiving section of the user terminal 20 in the present disclosure may be constituted with at least one of the transmitting/receiving section 220 and the transmitting/receiving antennas 230.

Note that the transmitting/receiving section 220 may receive a reference signal (for example, an SSB, a CSI-RS, or the like).

The control section 210 may assume that the spatial relation of the specific uplink transmission is the same as the transmission configuration indication (TCI) state of the specific downlink channel or the quasi-co-location (QCL) assumption. The transmitting/receiving section 220 may perform the specific uplink transmission by using the spatial relation.

When the spatial relation information is not configured by using sounding reference signal (SRS) configuration information, the control section 210 may assume that the spatial relation is the same as the TCI state or the QCL assumption.

When the field indicating the spatial relation is absent in the radio resource control (RRC) information element for a configuration of the specific uplink transmission, the control section 210 may assume that the spatial relation is the same as the active TCI state of the specific downlink channel, or the active TCI state or the QCL assumption of the control resource set having the lowest control resource set ID in the latest slot and being associated with a monitored search space.

When the higher layer parameter indicating the spatial relation information for the SRS resource of a specific type is not configured, the control section 210 may assume that the spatial relation is the same as the active TCI state of the specific downlink channel, or the active TCI state or the QCL assumption of the control resource set having the lowest control resource set ID in the latest slot and being associated with a monitored search space.

In the frequency (FR2) higher than 6 GHz, when the spatial relation information is not configured by using the SRS configuration information, the control section 210 may assume that the spatial relation is the same as the TCI state or the QCL assumption.

Hardware Structure

Note that the block diagrams that have been used to describe the above embodiments show blocks in functional units. These functional blocks (components) may be implemented in arbitrary combinations of at least one of hardware and software. Also, the method for implementing each functional block is not particularly limited. That is, each functional block may be realized by one piece of apparatus that is physically or logically coupled, or may be realized by directly or indirectly connecting two or more physically or logically separate pieces of apparatus (for example, via wire, wireless, or the like) and using these plurality of pieces of apparatus. The functional blocks may be implemented by combining softwares into the apparatus described above or the plurality of apparatuses described above.

Here, functions include judgment, determination, decision, calculation, computation, processing, derivation, investigation, search, confirmation, reception, transmission, output, access, resolution, selection, designation, establishment, comparison, assumption, expectation, considering, broadcasting, notifying, communicating, forwarding, configuring, reconfiguring, allocating (mapping), assigning, and the like, but function are by no means limited to these. For example, functional block (components) to implement a function of transmission may be referred to as a "transmitting section (transmitting unit)," a "transmitter," and the like. The method for implementing each component is not particularly limited as described above.

Figure 6:
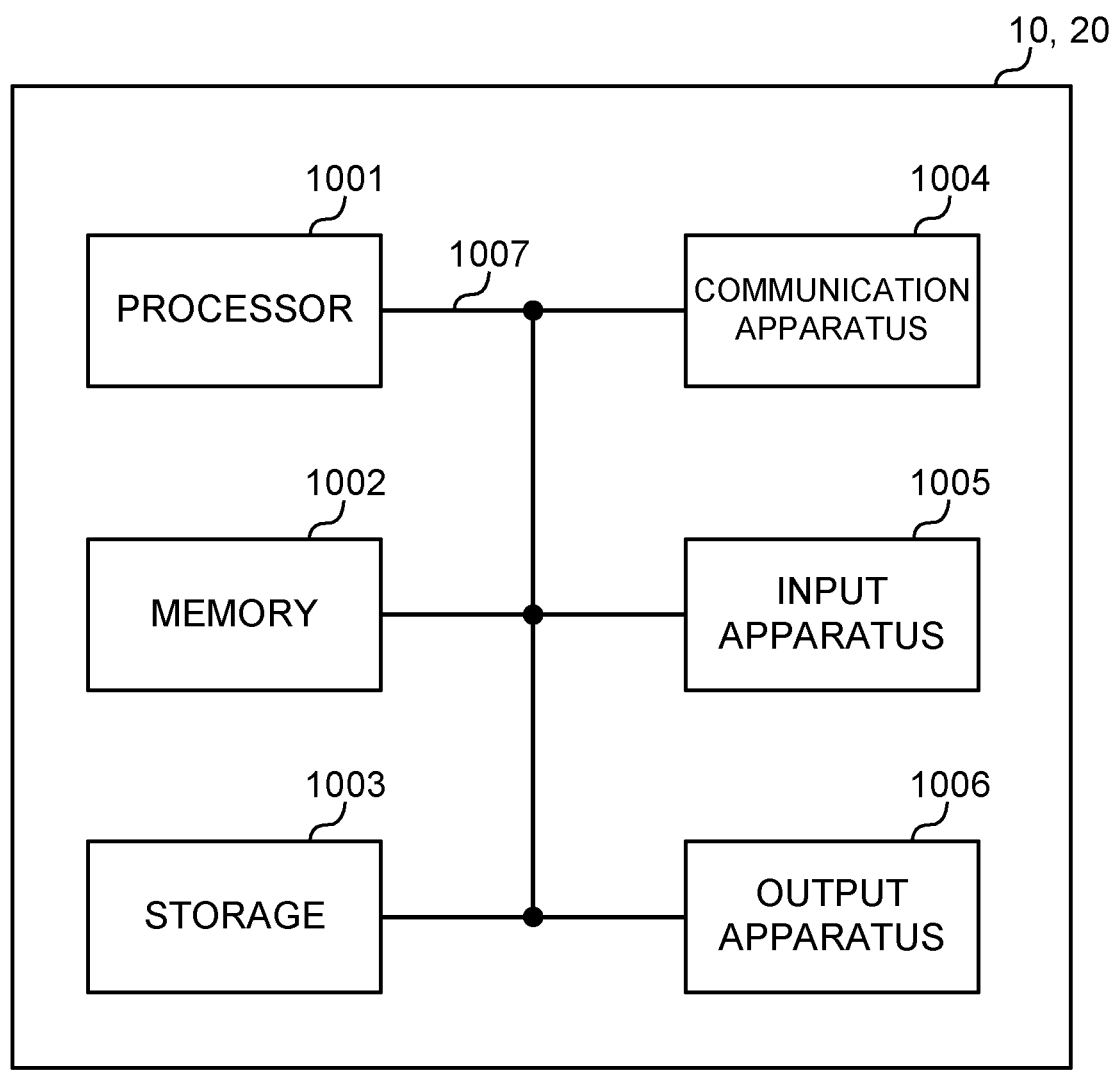
FIG. 6 is a diagram to show an example of a hardware structure of the base station and the user terminal according to one embodiment.

For example, a base station, a user terminal, and so on according to one embodiment of the present disclosure may function as a computer that executes the processes of the radio communication method of the present disclosure. FIG. 6 is a diagram to show an example of a hardware structure of the base station and the user terminal according to one embodiment. Physically, the above-described base station 10 and user terminal 20 may each be formed as computer an apparatus that includes a processor 1001, a memory 1002, a storage 1003, a communication apparatus 1004, an input apparatus 1005, an output apparatus 1006, a bus 1007, and so on.

Note that in the present disclosure, the words such as an apparatus, a circuit, a device, a section, a unit, and so on can be interchangeably interpreted. The hardware structure of the base station 10 and the user terminal 20 may be configured to include one or more of apparatuses shown in the drawings, or may be configured not to include part of apparatuses.

For example, although only one processor 1001 is shown, a plurality of processors may be provided. Furthermore, processes may be implemented with one processor or may be implemented at the same time, in sequence, or in different manners with two or more processors. Note that the processor 1001 may be implemented with one or more chips.

Each function of the base station 10 and the user terminals 20 is implemented, for example, by allowing certain software (programs) to be read on hardware such as the processor 1001 and the memory 1002, and by allowing the processor 1001 to perform calculations to control communication via the communication apparatus 1004 and control at least one of reading and writing of data in the memory 1002 and the storage 1003.

The processor 1001 controls the whole computer by, for example, running an operating system. The processor 1001 may be configured with a central processing unit (CPU), which includes interfaces with peripheral apparatus, control apparatus, computing apparatus, a register, and so on. For example, at least part of the above-described control section 110 (210), the transmitting/receiving section 120 (220), and so on may be implemented by the processor 1001.

Furthermore, the processor 1001 reads programs (program codes), software modules, data, and so on from at least one of the storage 1003 and the communication apparatus 1004, into the memory 1002, and executes various processes according to these. As for the programs, programs to allow computers to execute at least part of the operations of the above-described embodiments are used. For example, the control section 110 (210) may be implemented by control programs that are stored in the memory 1002 and that operate on the processor 1001, and other functional blocks may be implemented likewise.

The memory 1002 is a computer-readable recording medium, and may be constituted with, for example, at least one of a Read Only Memory (ROM), an Erasable Programmable ROM (EPROM), an Electrically EPROM (EEPROM), a Random Access Memory (RAM), and other appropriate storage media. The memory 1002 may be referred to as a "register," a "cache," a "main memory (primary storage apparatus)," and so on. The memory 1002 can store executable programs (program codes), software modules, and the like for implementing the radio communication method according to one embodiment of the present disclosure.

The storage 1003 is a computer-readable recording medium, and may be constituted with, for example, at least one of a flexible disk, a floppy (registered trademark) disk, a magneto-optical disk (for example, a compact disc (Compact Disc ROM (CD-ROM), and so on), a digital versatile disc, a Blu-ray (registered trademark) disk), a removable disk, a hard disk drive, a smart card, a flash memory device (for example, a card, a stick, and a key drive), a magnetic stripe, a database, a server, and other appropriate storage media. The storage 1003 may be referred to as "secondary storage apparatus."

The communication apparatus 1004 is hardware (transmitting/receiving device) for allowing inter-computer communication via at least one of wired and wireless networks, and may be referred to as, for example, a "network device," a "network controller," a "network card," a "communication module," and so on. The communication apparatus 1004 may be configured to include a high frequency switch, a duplexer, a filter, a frequency synthesizer, and so on in order to realize, for example, at least one of frequency division duplex (FDD) and time division duplex (TDD). For example, the above-described transmitting/receiving section 120 (220), the transmitting/receiving antennas 130 (230), and so on may be implemented by the communication apparatus 1004. In the transmitting/receiving section 120 (220), the transmitting section 120*a* (220*a*) and the receiving section 120*b* (220*b*) can be implemented while being separated physically or logically.

The input apparatus 1005 is an input device that receives input from the outside (for example, a keyboard, a mouse, a microphone, a switch, a button, a sensor, and so on). The output apparatus 1006 is an output device that allows sending output to the outside (for example, a display, a speaker, a Light Emitting Diode (LED) lamp, and so on). Note that the input apparatus 1005 and the output apparatus 1006 may be provided in an integrated structure (for example, a touch panel).

Furthermore, these types of apparatus, including the processor 1001, the memory 1002, and others, are connected by a bus 1007 for communicating information. The bus 1007 may be formed with a single bus, or may be formed with buses that vary between pieces of apparatus.

Also, the base station 10 and the user terminals 20 may be structured to include hardware such as a microprocessor, a digital signal processor (DSP), an Application Specific Integrated Circuit (ASIC), a Programmable Logic Device (PLD), a Field Programmable Gate Array (FPGA), and so on, and part or all of the functional blocks may be implemented by the hardware. For example, the processor 1001 may be implemented with at least one of these pieces of hardware.

Variations

Note that the terminology described in the present disclosure and the terminology that is needed to understand the present disclosure may be replaced by other terms that convey the same or similar meanings. For example, a "channel," a "symbol," and a "signal" (or signaling) may be interchangeably interpreted. Also, "signals" may be "messages." A reference signal may be abbreviated as an "RS," and may be referred to as a "pilot," a "pilot signal," and so on, depending on which standard applies. Furthermore, a "component carrier (CC)" may be referred to as a "cell," a "frequency carrier," a "carrier frequency," and so on.

A radio frame may be constituted of one or a plurality of periods (frames) in the time domain. Each of one or a plurality of periods (frames) constituting a radio frame may be referred to as a "subframe." Furthermore, a subframe may be constituted of one or a plurality of slots in the time domain. A subframe may be a fixed time length (for example, 1 ms) independent of numerology.

Here, numerology may be a communication parameter applied to at least one of transmission and reception of a certain signal or channel. For example, numerology may indicate at least one of a subcarrier spacing (SCS), a bandwidth, a symbol length, a cyclic prefix length, a transmission time interval (TTI), the number of symbols per TTI, a radio frame structure, a particular filter processing performed by a transceiver in the frequency domain, a particular windowing processing performed by a transceiver in the time domain, and so on.

A slot may be constituted of one or a plurality of symbols in the time domain (Orthogonal Frequency Division Multiplexing (OFDM) symbols, Single Carrier Frequency Division Multiple Access (SC-FDMA) symbols, and so on). Furthermore, a slot may be a time unit based on numerology.

A slot may include a plurality of mini-slots. Each mini-slot may be constituted of one or a plurality of symbols in the time domain. A mini-slot may be referred to as a "sub-slot." A mini-slot may be constituted of symbols less than the number of slots. A PDSCH (or PUSCH) transmitted in a time unit larger than a mini-slot may be referred to as "PDSCH (PUSCH) mapping type A." A PDSCH (or PUSCH) transmitted using a mini-slot may be referred to as "PDSCH (PUSCH) mapping type B."

A radio frame, a subframe, a slot, a mini-slot, and a symbol all express time units in signal communication. A radio frame, a subframe, a slot, a mini-slot, and a symbol may each be called by other applicable terms. Note that time units such as a frame, a subframe, a slot, mini-slot, and a symbol in the present disclosure may be interchangeably interpreted.

For example, one subframe may be referred to as a "TTI," a plurality of consecutive subframes may be referred to as a "TTI," or one slot or one mini-slot may be referred to as a "TTI." That is, at least one of a subframe and a TTI may be a subframe (1 ms) in existing LTE, may be a shorter period than 1 ms (for example, 1 to 13 symbols), or may be a longer period than 1 ms. Note that a unit expressing TTI may be referred to as a "slot," a "mini-slot," and so on instead of a "subframe."

Here, a TTI refers to the minimum time unit of scheduling in radio communication, for example. For example, in LTE systems, a base station schedules the allocation of radio resources (such as a frequency bandwidth and transmit power that are available for each user terminal) for the user terminal in TTI units. Note that the definition of TTIs is not limited to this.

TTIs may be transmission time units for channel-encoded data packets (transport blocks), code blocks, or codewords, or may be the unit of processing in scheduling, link adaptation, and so on. Note that, when TTIs are given, the time interval (for example, the number of symbols) to which transport blocks, code blocks, codewords, or the like are actually mapped may be shorter than the TTIs.

Note that, in the case where one slot or one mini-slot is referred to as a TTI, one or more TTIs (that is, one or more slots or one or more mini-slots) may be the minimum time unit of scheduling. Furthermore, the number of slots (the number of mini-slots) constituting the minimum time unit of the scheduling may be controlled.

A TTI having a time length of 1 ms may be referred to as a "normal TTI" (TTI in 3GPP Rel. 8 to Rel. 12), a "long TTI," a "normal subframe," a "long subframe," a "slot," and so on. A TTI that is shorter than a normal TTI may be referred to as a "shortened TTI," a "short TTI," a "partial or fractional TTI," a "shortened subframe," a "short subframe," a "mini-slot," a "sub-slot," a "slot," and so on.

Note that a long TTI (for example, a normal TTI, a subframe, and so on) may be interpreted as a TTI having a time length exceeding 1 ms, and a short TTI (for example, a shortened TTI and so on) may be interpreted as a TTI having a TTI length shorter than the TTI length of a long TTI and equal to or longer than 1 ms.

A resource block (RB) is the unit of resource allocation in the time domain and the frequency domain, and may include one or a plurality of consecutive subcarriers in the frequency domain. The number of subcarriers included in an RB may be the same regardless of numerology, and, for example, may be 12. The number of subcarriers included in an RB may be determined based on numerology.

Also, an RB may include one or a plurality of symbols in the time domain, and may be one slot, one mini-slot, one subframe, or one TTI in length. One TTI, one subframe, and so on each may be constituted of one or a plurality of resource blocks.

Note that one or a plurality of RBs may be referred to as a "physical resource block (Physical RB (PRB))," a "sub-carrier group (SCG)," a "resource element group (REG)," a "PRB pair," an "RB pair," and so on.

Furthermore, a resource block may be constituted of one or a plurality of resource elements (REs). For example, one RE may correspond to a radio resource field of one subcarrier and one symbol.

A bandwidth part (BWP) (which may be referred to as a "fractional bandwidth," and so on) may represent a subset of contiguous common resource blocks (common RBs) for certain numerology in a certain carrier. Here, a common RB may be specified by an index of the RB based on the common reference point of the carrier. A PRB may be defined by a certain BWP and may be numbered in the BWP.

The BWP may include a UL BWP (BWP for the UL) and a DL BWP (BWP for the DL). One or a plurality of BWPs may be configured in one carrier for a UE.

At least one of configured BWPs may be active, and a UE does not need to assume to transmit/receive a certain signal/channel outside active BWPs. Note that a "cell," a "carrier," and so on in the present disclosure may be interpreted as a "BWP."

Note that the above-described structures of radio frames, subframes, slots, mini-slots, symbols, and so on are merely examples. For example, structures such as the number of subframes included in a radio frame, the number of slots per subframe or radio frame, the number of mini-slots included in a slot, the numbers of symbols and RBs included in a slot or a mini-slot, the number of subcarriers included in an RB, the number of symbols in a TTI, the symbol length, the cyclic prefix (CP) length, and so on can be variously changed.

Also, the information, parameters, and so on described in the present disclosure may be represented in absolute values or in relative values with respect to certain values, or may be represented in another corresponding information. For example, radio resources may be specified by certain indices.

The names used for parameters and so on in the present disclosure are in no respect limiting. Furthermore, mathematical expressions that use these parameters, and so on may be different from those expressly disclosed in the present disclosure. For example, since various channels (PUCCH, PDCCH, and so on) and information elements can be identified by any suitable names, the various names allocated to these various channels and information elements are in no respect limiting.

The information, signals, and so on described in the present disclosure may be represented by using any of a variety of different technologies. For example, data, instructions, commands, information, signals, bits, symbols, chips, and so on, all of which may be referenced throughout the herein-contained description, may be represented by voltages, currents, electromagnetic waves, magnetic fields or particles, optical fields or photons, or any combination of these.

Also, information, signals, and so on can be output in at least one of from higher layers to lower layers and from lower layers to higher layers. Information, signals, and so on may be input and/or output via a plurality of network nodes.

The information, signals, and so on that are input and/or output may be stored in a specific location (for example, a memory) or may be managed by using a management table. The information, signals, and so on to be input and/or output can be overwritten, updated, or appended. The information, signals, and so on that are output may be deleted. The information, signals, and so on that are input may be transmitted to another apparatus.

Reporting of information is by no means limited to the aspects/embodiments described in the present disclosure, and other methods may be used as well. For example, reporting of information in the present disclosure may be implemented by using physical layer signaling (for example, downlink control information (DCI), uplink control information (UCI), higher layer signaling (for example, Radio Resource Control (RRC) signaling, broadcast information (master information block (MIB), system information blocks (SIBs), and so on), Medium Access Control (MAC) signaling, and so on), and other signals or combinations of these.

Note that physical layer signaling may be referred to as "Layer 1/Layer 2 (L1/L2) control information (L1/L2 control signals)," "L1 control information (L1 control signal)," and so on. Also, RRC signaling may be referred to as an "RRC message," and can be, for example, an RRC connection setup message, an RRC connection reconfiguration message, and so on. Also, MAC signaling may be reported using, for example, MAC control elements (MAC CEs).

Also, reporting of certain information (for example, reporting of "X holds") does not necessarily have to be reported explicitly, and can be reported implicitly (by, for example, not reporting this certain information or reporting another piece of information).

Determinations may be made in values represented by one bit (0 or 1), may be made in Boolean values that represent true or false, or may be made by comparing numerical values (for example, comparison against a certain value).

Software, whether referred to as "software," "firmware," "middleware," "microcode," or "hardware description language," or called by other terms, should be interpreted broadly to mean instructions, instruction sets, code, code segments, program codes, programs, subprograms, software modules, applications, software applications, software packages, routines, subroutines, objects, executable files, execution threads, procedures, functions, and so on.

Also, software, commands, information, and so on may be transmitted and received via communication media. For example, when software is transmitted from a website, a server, or other remote sources by using at least one of wired technologies (coaxial cables, optical fiber cables, twisted-pair cables, digital subscriber lines (DSL), and so on) and wireless technologies (infrared radiation, microwaves, and so on), at least one of these wired technologies and wireless technologies are also included in the definition of communication media.

The terms "system" and "network" used in the present disclosure can be used interchangeably. The "network" may mean an apparatus (for example, a base station) included in the network.

In the present disclosure, the terms such as "precoding," a "precoder," a "weight (precoding wait)," "quasi-co-location (QCL)," a "Transmission Configuration Indication state (TCI state)," a "spatial relation," a "spatial domain filter," a "transmit power," "phase rotation," an "antenna port," an "antenna port group," a "layer," "the number of layers," a "rank," a "resource," a "resource set," a "resource group," a "beam," a "beam width," a "beam angular degree," an "antenna," an "antenna element," a "panel," and so on can be used interchangeably.

In the present disclosure, the terms such as a "base station (BS)," a "radio base station," a "fixed station," a "NodeB," an "eNB (eNodeB)," a "gNB (gNodeB)," an "access point," a "transmission point (TP)," a "reception point (RP)," a "transmission/reception point (TRP)," a "panel," a "cell," a "sector," a "cell group," a "carrier," a "component carrier," and so on can be used interchangeably. The base station may be referred to as the terms such as a "macro cell," a small cell," a "femto cell," a "pico cell," and so on.

A base station can accommodate one or a plurality of (for example, three) cells. When a base station accommodates a plurality of cells, the entire coverage area of the base station can be partitioned into multiple smaller areas, and each smaller area can provide communication services through base station subsystems (for example, indoor small base stations (Remote Radio Heads (RRHs))). The term "cell" or "sector" refers to part of or the entire coverage area of at least one of a base station and a base station subsystem that provides communication services within this coverage.

In the present disclosure, the terms "mobile station (MS)," "user terminal," "user equipment (UE)," and "terminal" may be used interchangeably.

A mobile station may be referred to as a "subscriber station," "mobile unit," "subscriber unit," "wireless unit," "remote unit," "mobile device," "wireless device," "wireless communication device," "remote device," "mobile subscriber station," "access terminal," "mobile terminal," "wireless terminal," "remote terminal," "handset," "user agent," "mobile client," "client," or some other appropriate terms in some cases.

At least one of a base station and a mobile station may be referred to as a "transmitting apparatus," a "receiving apparatus," a "radio communication apparatus," and so on. Note that at least one of a base station and a mobile station may be device mounted on a mobile body or a mobile body itself, and so on. The mobile body may be a vehicle (for example, a car, an airplane, and the like), may be a mobile body which moves unmanned (for example, a drone, an automatic operation car, and the like), or may be a robot (a manned type or unmanned type). Note that at least one of a base station and a mobile station also includes an apparatus which does not necessarily move during communication operation. For example, at least one of a base station and a mobile station may be an Internet of Things (IoT) device such as a sensor, and the like.

Furthermore, the base station in the present disclosure may be interpreted as a user terminal. For example, each aspect/embodiment of the present disclosure may be applied to the structure that replaces a communication between a base station and a user terminal with a communication between a plurality of user terminals (for example, which may be referred to as "Device-to-Device (D2D)," "Vehicle-to-Everything (V2X)," and the like). In this case, user terminals 20 may have the functions of the base stations 10 described above. The words "uplink" and "downlink" may be interpreted as the words corresponding to the terminal-to-terminal communication (for example, "side"). For example, an uplink channel, a downlink channel, and so on may be interpreted as a side channel.

Likewise, the user terminal in the present disclosure may be interpreted as base station. In this case, the base station 10 may have the functions of the user terminal 20 described above.

Actions which have been described in the present disclosure to be performed by a base station may, in some cases, be performed by upper nodes. In a network including one or a plurality of network nodes with base stations, it is clear that various operations that are performed to communicate with terminals can be performed by base stations, one or more network nodes (for example, Mobility Management Entities (MMEs), Serving-Gateways (S-GWs), and so on may be possible, but these are not limiting) other than base stations, or combinations of these.

The aspects/embodiments illustrated in the present disclosure may be used individually or in combinations, which may be switched depending on the mode of implementation. The order of processes, sequences, flowcharts, and so on that have been used to describe the aspects/embodiments in the present disclosure may be re-ordered as long as inconsistencies do not arise. For example, although various methods have been illustrated in the present disclosure with various components of steps in exemplary orders, the specific orders that are illustrated herein are by no means limiting.

The aspects/embodiments illustrated in the present disclosure may be applied to Long Term Evolution (LTE), LTE-Advanced (LTE-A), LTE-Beyond (LTE-B), SUPER 3G, IMT-Advanced, 4th generation mobile communication system (4G), 5th generation mobile communication system (5G), Future Radio Access (FRA), New-Radio Access Technology (RAT), New Radio (NR), New radio access (NX), Future generation radio access (FX), Global System for Mobile communications (GSM (registered trademark)), CDMA 2000, Ultra Mobile Broadband (UMB), IEEE 802.11 (Wi-Fi (registered trademark)), IEEE 802.16 (WiMAX (registered trademark)), IEEE 802.20, Ultra-WideBand (UWB), Bluetooth (registered trademark), systems that use other adequate radio communication methods and next-generation systems that are enhanced based on these. A plurality of systems may be combined (for example, a combination of LTE or LTE-A and 5G, and the like) and applied.

The phrase "based on" (or "on the basis of") as used in the present disclosure does not mean "based only on" (or "only on the basis of"), unless otherwise specified. In other words, the phrase "based on" (or "on the basis of") means both "based only on" and "based at least on" ("only on the basis of" and "at least on the basis of").

Reference to elements with designations such as "first," "second," and so on as used in the present disclosure does not generally limit the quantity or order of these elements. These designations may be used in the present disclosure only for convenience, as a method for distinguishing between two or more elements. Thus, reference to the first and second elements does not imply that only two elements may be employed, or that the first element must precede the second element in some way.

The term "judging (determining)" as in the present disclosure herein may encompass a wide variety of actions. For example, "judging (determining)" may be interpreted to mean making "judgments (determinations)" about judging, calculating, computing, processing, deriving, investigating, looking up, search and inquiry (for example, searching a table, a database, or some other data structures), ascertaining, and so on.

Furthermore, "judging (determining)" may be interpreted to mean making "judgments (determinations)" about receiving (for example, receiving information), transmitting (for example, transmitting information), input, output, accessing (for example, accessing data in a memory), and so on.

In addition, "judging (determining)" as used herein may be interpreted to mean making "judgments (determinations)" about resolving, selecting, choosing, establishing, comparing, and so on. In other words, "judging (determining)" may be interpreted to mean making "judgments (determinations)" about some action.

In addition, "judging (determining)" may be interpreted as "assuming," "expecting," "considering," and the like.

The terms "connected" and "coupled," or any variation of these terms as used in the present disclosure mean all direct or indirect connections or coupling between two or more elements, and may include the presence of one or more intermediate elements between two elements that are "connected" or "coupled" to each other. The coupling or connection between the elements may be physical, logical, or a combination thereof. For example, "connection" may be interpreted as "access."

In the present disclosure, when two elements are connected, the two elements may be considered "connected" or "coupled" to each other by using one or more electrical wires, cables and printed electrical connections, and, as some non-limiting and non-inclusive examples, by using electromagnetic energy having wavelengths in radio frequency regions, microwave regions, (both visible and invisible) optical regions, or the like.

In the present disclosure, the phrase "A and B are different" may mean that "A and B are different from each other." Note that the phrase may mean that "A and B is each different from C." The terms "separate," "be coupled," and so on may be interpreted similarly to "different."

When terms such as "include," "including," and variations of these are used in the present disclosure, these terms are intended to be inclusive, in a manner similar to the way the term "comprising" is used. Furthermore, the term "or" as used in the present disclosure is intended to be not an exclusive disjunction.

For example, in the present disclosure, when an article such as "a," "an," and "the" in the English language is added by translation, the present disclosure may include that a noun after these articles is in a plural form.

Now, although the invention according to the present disclosure has been described in detail above, it should be obvious to a person skilled in the art that the invention according to the present disclosure is by no means limited to the embodiments described in the present disclosure. The invention according to the present disclosure can be implemented with various corrections and in various modifications, without departing from the spirit and scope of the invention defined by the recitations of claims. Consequently, the description of the present disclosure is provided only for the purpose of explaining examples, and should by no means be construed to limit the invention according to the present disclosure in any way.

What is claimed is:

1. A terminal comprising:
a processor that assumes that, when a higher layer parameter indicating spatial relation information of a sounding reference signal (SRS) transmitted in a frequency higher than 6 GHz is not configured, a spatial relation of the SRS is the same as an active transmission configuration indication (TCI) state of a downlink shared channel (PDSCH); and
a transmitter that transmits the SRS by using the spatial relation.

2. A radio communication method for a terminal, comprising:
assuming that, when a higher layer parameter indicating spatial relation information of a sounding reference signal (SRS) transmitted in a frequency higher than 6 GHz is not configured, a spatial relation of the SRS is the same as an active transmission configuration indication (TCI) state of a downlink shared channel (PDSCH); and
transmitting the SRS by using the spatial relation.

3. A base station comprising:
a processor that assumes that, when a higher layer parameter indicating spatial relation information of a sounding reference signal (SRS) transmitted in a frequency higher than 6 GHz is not configured in a terminal, a spatial relation of the SRS is the same as an active transmission configuration indication (TCI) state of a downlink shared channel (PDSCH); and
a receiver that receives the SRS by using the spatial relation.

4. A system comprising a terminal and a base station, wherein
the terminal comprises:
a processor that assumes that, when a higher layer parameter indicating spatial relation information of a sounding reference signal (SRS) transmitted in a frequency higher than 6 GHz is not configured, a spatial relation of the SRS is the same as an active transmission configuration indication (TCI) state of a downlink shared channel (PDSCH); and
a transmitter that transmits the SRS by using the spatial relation, and
the base station comprises:
a receiver that receives the SRS.

* * * * *